US010918980B2

(12) United States Patent
Takahashi

(10) Patent No.: US 10,918,980 B2
(45) Date of Patent: Feb. 16, 2021

(54) FILTERING APPARATUS

(71) Applicant: FUJI FILTER MANUFACTURING CO., LTD., Tokyo (JP)

(72) Inventor: Yuichi Takahashi, Utsunomiya (JP)

(73) Assignee: FUJI FILTER MANUFACTURING CO., LTD., Tokyo (JP)

( * ) Notice: Subject to any disclaimer, the term of this patent is extended or adjusted under 35 U.S.C. 154(b) by 838 days.

(21) Appl. No.: 15/115,590

(22) PCT Filed: Jan. 31, 2014

(86) PCT No.: PCT/JP2014/052319
§ 371 (c)(1),
(2) Date: Jul. 29, 2016

(87) PCT Pub. No.: WO2015/114812
PCT Pub. Date: Aug. 6, 2015

(65) Prior Publication Data
US 2017/0151512 A1    Jun. 1, 2017

(51) Int. Cl.
*B01D 29/68*  (2006.01)
*B01D 46/00*  (2006.01)
*B01D 29/11*  (2006.01)
*B01D 46/24*  (2006.01)
*B01D 29/52*  (2006.01)
*B01D 29/66*  (2006.01)
*B01D 29/64*  (2006.01)

(52) U.S. Cl.
CPC .............. *B01D 29/68* (2013.01); *B01D 29/11* (2013.01); *B01D 29/52* (2013.01);
(Continued)

(58) Field of Classification Search
CPC ........ B01D 29/68; B01D 29/11; B01D 29/52; B01D 29/668; B01D 29/6423;
(Continued)

(56) References Cited

U.S. PATENT DOCUMENTS 3,318,452 A * 5/1967 Adams ................... B01D 29/52
 210/333.1
5,817,158 A * 10/1998 Cox ..................... B01D 46/002
 55/472
2002/0092805 A1 7/2002 Koivula

FOREIGN PATENT DOCUMENTS

JP         S61149214 A    7/1986
JP          1157335 A     3/1999
(Continued)

OTHER PUBLICATIONS

Takahashi-JP-2013-091046 (machine translation and original attached) (Year: 2013).*
(Continued)

*Primary Examiner* — Liam Royce
(74) *Attorney, Agent, or Firm* — Morgan, Lewis & Bockius LLP

(57) ABSTRACT

The filtering apparatus includes: a casing having an inlet for a fluid from the outside and an outlet for the fluid having filtered therein; filter elements having opposite-end openings, provided in the casing, and each filtering the fluid by allowing the fluid to flow therethrough in inside-to-outside directions; backwashing pipes sequentially connected to the opposite-end openings at different timings between the opposite-end openings of each filter element so as to backwash the filter element by allowing the fluid to flow therethrough in outside-in directions; removers each axially moved in the corresponding filter element by the filtration or backwashing flow, while sliding in contact with the inner periphery of the filter element so as to remove trapped objects; and a backwashing fluid drain pipe coupled to the discharge side of the backwashing pipes and allowing the trapped objects removed by each remover to be discharged to the outside.

2 Claims, 16 Drawing Sheets

(52) U.S. Cl.
CPC ....... *B01D 29/6423* (2013.01); *B01D 29/668* (2013.01); *B01D 46/002* (2013.01); *B01D 46/0065* (2013.01); *B01D 46/0067* (2013.01); *B01D 46/0071* (2013.01); *B01D 46/2403* (2013.01); B01D 29/66 (2013.01); B01D 2201/0453 (2013.01); B01D 2267/30 (2013.01)

(58) Field of Classification Search
CPC .............. B01D 46/002; B01D 46/0071; B01D 46/0065; B01D 46/2403; B01D 46/0067; B01D 2267/30; B01D 2201/0453; B01D 29/66
See application file for complete search history.

(56) References Cited

FOREIGN PATENT DOCUMENTS

| | | |
|---|---|---|
| JP | 2003-509200 A | 3/2003 |
| JP | 2013-091046 A | 5/2013 |
| KR | 2014-0000046 A | 1/2014 |
| KR | 10-0752406 B1 | 8/2017 |
| WO | WO-0189658 A1 * 11/2001 ............. B01D 29/52 |
| WO | 2007/062763 A1 | 6/2007 |

OTHER PUBLICATIONS

Lennartz WO 0189658 (translation and original) (Year: 2001).*
Japanese Office Action dated May 10, 2016 in Appln. No. 2012-178682 and its English translation.
International Preliminary Report on Patentability dated Aug. 11, 2016, which issued in International Application No. PCT/JP2014/052319, together with English language translation thereof.
Chinese Office Action from Chinese Application No. 201480074600.0, dated Mar. 16, 2017.
Korean Office Action, which issued in Korean Patent Application No. 10-2016-7020812, dated Jan. 30, 2020, 12 pages including English language translation.

* cited by examiner

FILTERING APPARATUS

TECHNICAL FIELD

The present invention relates to a filtering apparatus that includes tubular filter elements for inside-to-outside filtration each having openings at opposite ends in its longitudinal direction, and that can be backwashed by causing fluid to flow through the filter elements in the reverse directions of those for filtration so as to remove objects trapped and adhered to the filter elements. Specifically, the present invention relates to the filtering apparatus that performs filtration and backwashing from the opposite end openings of the filter elements while removing the trapped objects by trapped object removers which are provided in the filter elements and movable in its axial direction by the fluid flow in the axial direction generated during filtration or backwashing.

BACKGROUND ART

Conventionally, various filtering apparatuses are used for filtering water such as seawater, lake water, river water, drinking water or sewage water, for filtering liquids widely used in industries such as cooling water or process liquids for any of various apparatuses, and also for filtering ingredient gases or the like used in a chemical factory or the like, so as to trap and remove substances such as microparticles and dust included in such fluid to be filtered.

When the filtering apparatus performs filtration for long periods, solid and/or gel-like substances such as dust trapped by the filter elements are accumulated in the filter elements. This increases the resistance of the filter media for the fluid to pass through, and eventually makes the filtering apparatus hardly capable of filtering the fluid. To address this problem, the filtering performance of the filter elements is restored by, for example, periodically performing an operation called "backwashing," which is a process of causing fluid to pass through the filter elements in the reverse directions of those for filtration so as to release objects trapped and adhered to the filter elements.

This backwashing operation is effective but sometimes fails to completely remove the objects that are trapped and adhered to the filter elements, so that some objects might be left trapped in the filter elements after backwashing. Accordingly, even repeating of the backwashing operation might not prevent increase in the resistance of the filter media to the fluid flow, which eventually makes the filtering apparatus hardly capable of filtering the fluid. In particular, when gel-like substances such as dust and/or substances such as dust coated with highly adhesive material are strongly stuck on the surfaces of the filter elements, as in the case of filtering the industrial liquid, it is difficult to restore the filtering performance of the filter elements only by backwashing of simply causing fluid to flow through the filter elements in the reverse directions of those for filtration. This is especially true in a filtering apparatus including filter elements of a mesh size less than 200 µm.

Much the same is true of filtration performed under the condition where substances such as fibrous dust are entangled in the filter elements. Such a filtration condition is very likely to occur especially when the fluid to be filtered includes microorganisms, as in filtering water such as seawater, lake water, river water, drinking water or sewage water. For example, when filtering ballast water (seawater) in a vessel's ballast tank, the filtering apparatus traps therein a lot of algae included in the seawater. As a result, fibrous substances including fibrous algae and/or cellulose substances are entangled in the filter elements and cannot be easily removed therefrom.

To address the above, a filtering apparatus capable of restoring the filtering performance of the filter elements has been proposed. An example of the filtering apparatuses of this type includes an inlet channel for the flow to be filtered, an outlet channel for the filtered flow, a number of parallel filtering elements and at least one washing mechanism. The filtering elements are open from both ends, into which the flow to be filtered may be directed so that the infiltration occurs through the element out of the element. The washing mechanism connects alternately to the different ends of the elements at both ends of the filtering elements, and forms a discharge channel for the backflushing of the elements generated with the pressure of the filtered flow. Each of the filtering elements is divided in two between its ends so that the washing mechanism connected to the end of the element generates backflushing only for a part of the element length at a time (see Patent Document 1, for example).

Another example of the filtering apparatuses of this type also includes an inlet channel for the flow to be filtered, an outlet channel for the filtered flow, a number of parallel filtering elements open from both ends, and a washing mechanism. The washing mechanism connects alternately to the different ends of the elements at both ends of the filtering elements, and forms a discharge channel for the backflushing of the elements generated with the pressure of the filtered flow (see Patent Document 2, for example).

REFERENCE DOCUMENT LIST

Patent Documents

Patent Document 1: JP 2003-509200 A
Patent Document 2: WO 2007/062763 A1

SUMMARY OF THE INVENTION

Problems to be Solved by the Invention

Each of the filtering apparatuses disclosed in Patent Documents 1 and 2 performs backwashing for releasing objects trapped and adhered to the filter elements, from the opposite end openings of each of the filter elements, at different timings. However, these filtering apparatuses perform backwashing simply by using the pressure of the fluid flow. It is, however, difficult to restore the filtering performance of the filter elements only by backwashing simply using the pressure of the fluid flow, when fibrous substances such as dust are entangled in the filter elements, or when the entangled fibrous substances are coated with highly sticky or adhesive material.

To address the above problems, the present invention provides the filtering apparatus that performs filtration and backwashing from the opposite end openings of the filter elements, while removing the trapped objects by the trapped object removers which are provided in the filter elements and moved in the axial direction thereof by the fluid flow in the axial direction generated during filtration or backwashing.

Means for Solving the Problems

To solve the above problems, the filtering apparatus according to the present invention includes a casing, multiple filter elements, backwashing pipes, trapped object removers and a backwashing fluid drain pipe. The casing has a fluid inlet that allows fluid to flow in from an outside of the casing, and a fluid outlet that allows the fluid having filtered in the filtering apparatus to flow to the outside. The filter elements are provided in parallel to each other in the casing. Each of the filter elements has a tubular shape with openings at opposite ends in a longitudinal direction thereof, and filters the fluid by allowing the fluid to pass through the filter element from the inside to the outside. The backwashing pipes are sequentially connected to the opposite end openings of the multiple filter elements at different timings between the opposite end openings of each of the filter elements so as to backwash the filter element that is connected to any one of the backwashing pipes by allowing the fluid to flow through the filter element from the outside to the inside. The trapped object removers are provided in the filter elements. Each of the trapped object removers is moved, by a flow of the fluid in an axial direction of the corresponding filter element generated during filtration or backwashing, in the filter element in the axial direction while an outer periphery of the trapped object remover slides in contact with an inner periphery of the filter element so as to remove an object trapped by the filter element. To a discharge side of the backwashing pipes, coupled is the backwashing fluid drain pipe for discharging, to the outside of the casing, the trapped object removed by each of the trapped object removers that is moved by the fluid flow generated while backwashing the corresponding filter element is coupled to a discharge side of the backwashing pipes.

Each of the trapped object removers may be a removal brush having a brush main body and bristles planted on an outer periphery of the brush main body.

Alternatively, each of the trapped object removers may be a blade-shaped or spatula-shaped scraper made of a metal, a resin or rubber.

The backwashing pipes, which have connecting ports sequentially connected to the opposite end openings of the filter elements, may be provided with blind lids on the connecting ports. Each of the blind lids is long enough to cover any adjacent two of the openings of the filter elements and extends asymmetrically with respect to the corresponding backwashing pipe so that the asymmetric placement of the blind lid at one ends of the filter elements is an inverse of that of the blind lid at the other ends of the filter elements.

The blind lids provided so that the asymmetric placement of the blind lid at the one ends of the filter elements is the inverse of that of the blind lid at the other ends of the filter elements may be formed so that, when the connecting port of one of the backwashing pipes is connected to one of the opposite end openings of any one of the filter elements, the other one of the opposite end openings of the filter element is closed by a longer portion, extending from the other backwashing pipe, of one of the blind lids.

Each of the filter elements may be provided with a partition member that is provided at a middle portion in the longitudinal direction of the corresponding filter element, and that has a structure capable of restricting the fluid flow in the filter element while allowing part of the fluid to flow therethrough. In this case, the trapped object removers may be provided in the filter element on opposite sides, that is, a side closer to one of the opposite end openings and a side closer to the other one of the opposite end openings, of the partition member.

Effects of the Invention

In the filtering apparatus according to the present invention, which includes the filter elements provided in parallel to each other in the casing, and each having a tubular shape with the openings at the opposite ends in the longitudinal direction thereof, the backwashing pipes are sequentially connected to the opposite end openings of the filter elements at different timings between the opposite end openings of each of the filter elements. The backwashing pipes allow the filtering apparatus to perform backwashing by causing the fluid to flow through the filter elements from the outside to the inside. Moreover, the filtering apparatus further includes the trapped object removers in the filter elements. Each of the trapped object removers can remove objects that is trapped by the corresponding filter element by causing its outer periphery to slide in contact with the inner periphery of the filter element while the fluid flow in the axial direction of the filter element generated during filtration or backwashing moves the trapped object remover in the filter element in its axial direction. Thus, the filtering apparatus can backwash each of the filter elements by using the fluid flow entering therein through the backwashing pipes while removing objects trapped and adhered to the inner periphery of the filter element by using the corresponding trapped object remover which is movable in the filter element in its axial direction by the fluid flow. This configuration allows for more stable restoration of the filtering performance of the filter elements than the conventional techniques even when fibrous substances such as dust are entangled in the filter elements, and even when the entangled fibrous substances are coated with highly sticky or adhesive material.

The filtering apparatus configured as above may be used as a ballast water treatment apparatus for filtering ballast water (seawater) in a vessel's ballast tank. For that use, the filtering apparatus can easily remove fibrous algae entangled in the filter elements. Furthermore, the filtering apparatus may be used for filtering water such as seawater, lake water, river water, drinking water or sewage water, for filtering liquids widely used in industries such as cooling water or process liquids for any of various apparatuses, and also for filtering ingredient gases or the like used in a chemical factory or the like. For that use, the filtering apparatus can trap and remove substances such as microparticles and dust included in such fluid to be filtered.

MODES FOR CARRYING OUT THE INVENTION

Hereinafter, embodiments of the present invention will be described with reference to the attached drawings.

Figure 1:
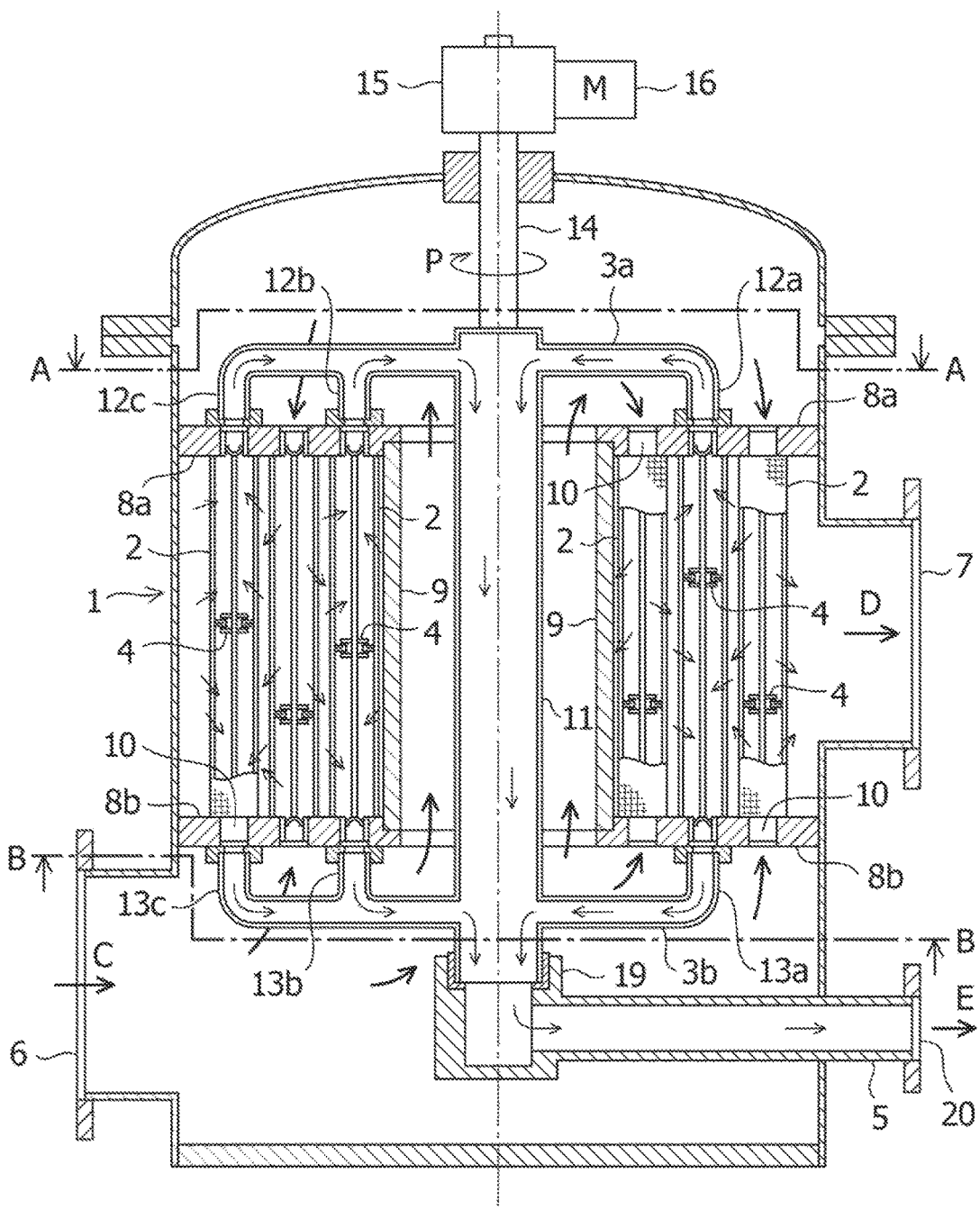
FIG. 1 is a front cross-sectional view of an embodiment of the filtering apparatus according to the present invention.

FIG. 1 is a front cross-sectional view of an embodiment of the filtering apparatus according to the present invention. The filtering apparatus is used for filtering water such as seawater (ballast water within a vessel, for example), lake water, river water, drinking water or sewage water, for filtering liquids widely used in industries such as cooling water or process liquids for any of various apparatuses, and also for filtering ingredient gases or the like used in a chemical factory or the like. The filtering apparatus traps and removes substances such as microparticles and dust included in such fluid to be filtered, and includes a casing 1, filter elements 2, backwashing pipes 3a and 3b, trapped object removers 4 and a backwashing fluid drain pipe 5, as shown in FIG. 1.

The casing 1 is an outer shell of the filtering apparatus, and formed in a shape such as a tubular shape (cylindrical shape, for example) with top lid and closed bottom or a rectangular parallelepiped shape. The casing 1 has a fluid inlet 6 at the lower end of the sidewall of the casing 1, and a fluid outlet 7 in an upper portion of the sidewall, for example. The fluid inlet 6 allows fluid to flow in from the outside. The fluid outlet 7 allows the fluid having filtered in the filtering apparatus to flow to the outside. The casing 1 is formed of a material such as a metal or a synthetic resin, and may have any shape and size appropriately determined in accordance with conditions such as the intended use of the filtering apparatus, the type and volume of liquid, gas or the like to be filtered, and the installation site.

Mounting plates 8a and 8b are each a donut-shaped plate having, for example, a circular opening at the center, and respectively mounted on the inner sides of upper and lower portions of the casing 1. A cylindrical wall 9 is provided to be vertically erected on the circumferences of the center openings of the mounting plates 8a and 8b. Multiple through holes 10 are formed in each of the mounting plates 8a and 8b. The inner wall of the casing 1, the mounting plates 8a and 8b and the cylindrical wall 9 arranged as above enclose and define a tubular donut-shaped space.

In the tubular donut-shaped space enclosed by the inner wall of the casing 1, the mounting plates 8a and 8b and the cylindrical wall 9, the multiple filter elements 2 are provided in parallel to each other. Each filter element 2 is formed in a tubular shape such, for example, as a cylindrical shape, and allows fluid to be filtered to pass therethrough from the inside to the outside so as to trap and filter out solid and/or gel-like substances such as dust included in the fluid. The filter element 2 has openings at the opposite ends in its longitudinal direction. The filter elements 2 are vertically arranged in the casing 1 with these opposite end openings coupled to the through holes 10 formed in the mounting plates 8a and 8b. Thereby, the tubular donut-shaped space enclosed by the inner wall of the casing 1, the mounting plates 8a and 8b and the cylindrical wall 9 is configured to be a filtering chamber that filters the fluid to be filtered.

Figure 2:
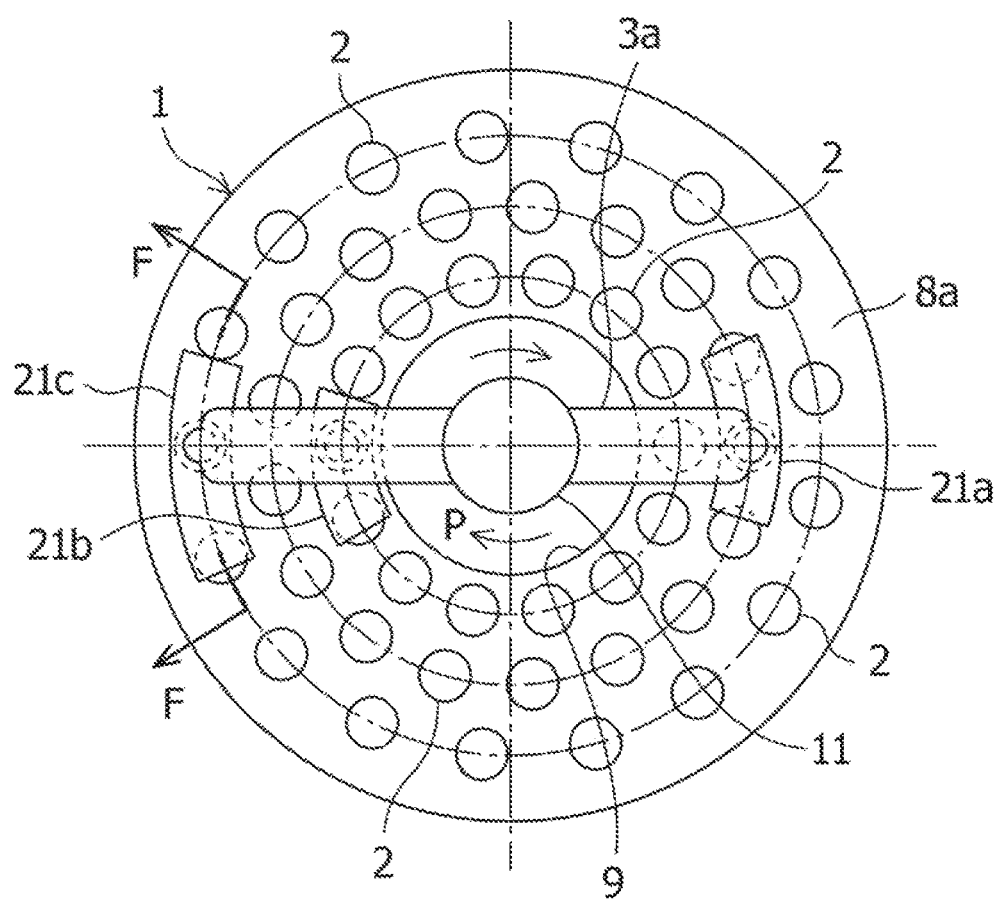
FIG. 2 is a cross-sectional view of the filtering apparatus shown in FIG. 1 taken along A-A line.
Figure 3:
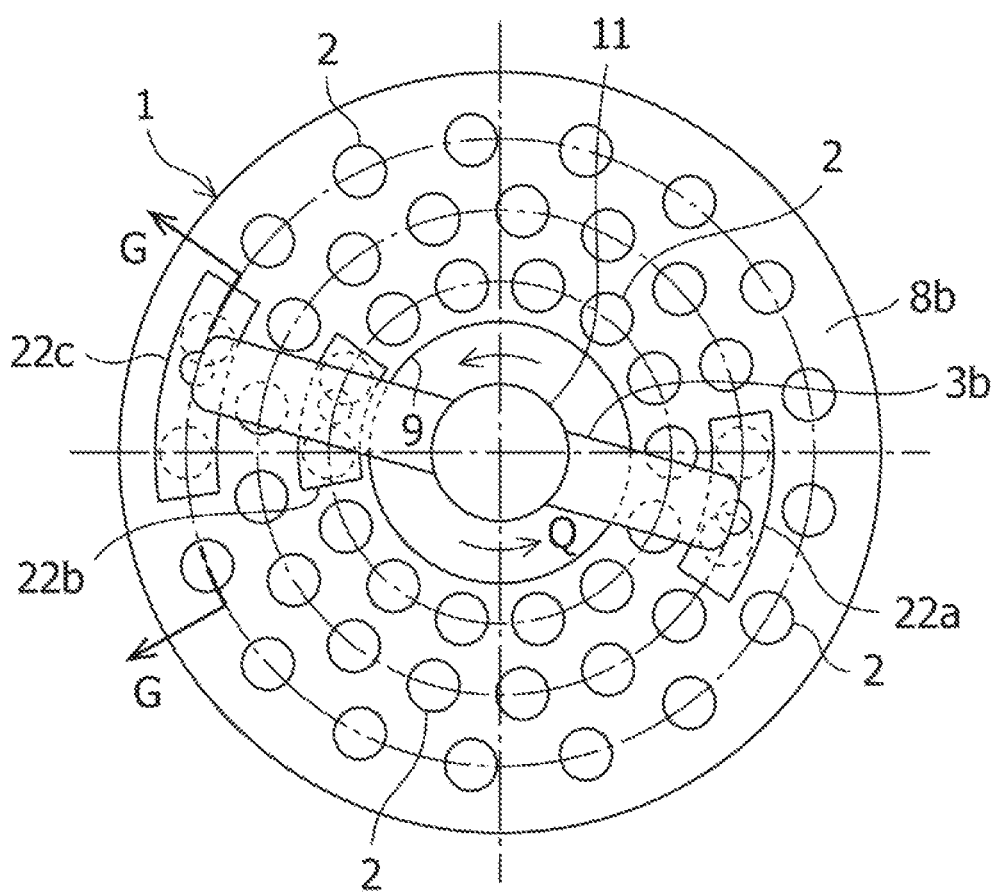
FIG. 3 is a cross-sectional view of the filtering apparatus shown in FIG. 1 taken along B-B line.

As shown in FIGS. 2 and 3, the multiple filter elements 2 are arranged on one or more (three, for example) concentric circles in the tubular donut-shaped filtering chamber enclosed by the inner wall of the casing 1, the mounting plates 8a and 8b and the cylindrical wall 9. The filter elements 2 on each concentric circle are arranged at a predetermined pitch individually set for the concentric circle. The number of the filter elements 2 may differ from one concentric circle to another. Although the filter elements 2 are arranged on the three concentric circles in FIGS. 2 and 3, the number of these concentric circles is not limited to three, but may be one, two or more than four.

Each filter element 2 has only to include multilayered filter media in which the finest mesh filter medium lies in the innermost layer. Examples of the filter element 2 include a cylindrical sintered mesh filter element, a cylindrical notch wire filter element and a cylindrical wedge wire filter element. The cylindrical sintered mesh filter element may be one formed by sintering multiple metal-mesh layers to increase their shape retention capability and then by forming these sintered mesh layers into a cylindrical shape. When the sintered mesh filter element is employed, the mesh size of the innermost layer may be appropriately selected from the range of from 10 to 200 μm while the mesh size of the other outer layers may be appropriately selected from the range of from 200 to 5000 μm. In this case, the properties of reinforcing mesh and protecting mesh in the layers other than the innermost layer will affect the strength of the filter element. Accordingly, the number, the mesh size and the wire diameter of these outer layers are appropriately selected so that the filter element can provide a required strength. The mesh of the filter element 2 may be plain woven, twilled woven, sateen woven, dutch woven, twilled dutch woven and/or the like. As an alternative, the filter element 2 may be formed first by arranging, around metal mesh in the innermost layer, cylindrical perforated tubes with numerous square holes or a reinforcing member including multiple axially extending thin rods arranged side by side, and then by sintering the resultant layers. The shape, size and number of the filter elements 2 may be appropriately determined in accordance with conditions such as the intended use and the filtering performance of the filtering apparatus, the size of the casing 1 and the type of the fluid to be filtered.

The openings at the opposite ends (upper and lower ends) of the multiple filter elements 2 are connected to the backwashing pipes 3a and 3b, as shown in FIG. 1. The backwashing pipes 3a and 3b are used for "backwashing," which is a process of causing fluid to flow through the filter elements 2 from the outside to the inside the reverse of those for filtration so as to release objects trapped and adhered to the filter elements 2. The first backwashing pipe 3a is sequentially connected to the upper end openings of the filter elements 2. The second backwashing pipe 3b is sequentially connected to the lower end openings of the filter elements 2 at different timings from the backwashing pipe 3a.

In FIG. 1, the first backwashing pipe 3a is communicatively joined to the upper end of a hollow discharge pipe 11, which is rotatably provided at the center of the casing 1. The first backwashing pipe 3a includes right and left arms extending radially from the discharge pipe 11. In FIGS. 1 and 2, the right arm extends to the upper end openings of the filter elements 2 on the second concentric circle from the center. Accordingly, a backwashing nozzle 12a of the first backwashing pipe 3a, which is directed downward, is connected to any one of the through holes 10 formed in the upper mounting plate 8a. The left arm extends to the upper end openings of the filter elements 2 on the first and third concentric circles from the center. Accordingly, backwashing nozzles 12b and 12c of the first backwashing pipe 3a, which are directed downward, are connected to any of the through holes 10 formed in the upper mounting plate 8a.

In FIG. 1, the second backwashing pipe 3b is communicatively joined to the lower end of the hollow discharge pipe 11. The second backwashing pipe 3b includes right and left arms extending radially from the discharge pipe 11. In FIGS. 1 and 2, the right arm extends to the lower end openings of the filter elements 2 on the second concentric circle from the center. Accordingly, a backwashing nozzle 13a of the second backwashing pipe 3b, which is directed upward, is connected to any one of the through holes 10 formed in the lower mounting plate 8b. The left arm extends to the lower end openings of the filter elements 2 on the first and third concentric circles from the center. Accordingly, backwashing nozzles 13b and 13c of the second backwashing pipe 3b, which are directed upward, are connected to any of the through holes 10 formed in the lower mounting plate 8b.

A shaft 14 is mounted on the upper end, which is joined to the first backwashing pipe 3a, of the discharge pipe 11. The shaft 14 extends upwardly on the central axis of the discharge pipe 11 so as to protrude to the outside of the casing 1. A gearbox 15 is provided to the protruding end of the shaft 14 and rotationally driven by a motor 16. When rotationally driven, the motor 16 rotates the shaft 14 in, for example, the clockwise direction indicated by arrow P. As a result, the first backwashing pipe 3a rotates in the direction indicated by arrow P, so that the backwashing nozzles 12a, 12b and 12c of the first backwashing pipe 3a are sequentially connected to the upper end openings of the multiple filter elements 2 arranged, for example, on the concentric circles, as shown in FIG. 2. At the same time, as shown in FIG. 3, the second backwashing pipe 3b rotates in the direction indicated by arrow Q (identical to the direction indicated by arrow P in a cross-sectional view taken along A-A line of FIG. 1), so that the backwashing nozzles 13a, 13b and 13c of the second backwashing pipe 3b are sequentially connected to the lower end openings of the multiple filter elements 2.

In this case, as shown in FIGS. 2 and 3, the location where the first backwashing pipe 3a is coupled to the upper end of the discharge pipe 11 is displaced from the location where the second backwashing pipe 3b is coupled to the lower end of the discharge pipe 11 by an angle appropriately set according to the arrangement pitches of the filter elements 2. Accordingly, when the motor 16, shown in FIG. 1, is rotationally driven to rotate the first and second backwashing pipes 3a and 3b, the backwashing nozzles 12a, 12b and 12c on the first backwashing pipe 3a are sequentially connected to the upper end openings of the filter elements 2 while the backwashing nozzles 13a, 13b and 13c on the second backwashing pipe 3b are sequentially connected to the lower end openings of the filter elements 2 at different timings from the backwashing pipe 3a.

FIG. 1 shows the filtering apparatus as if the backwashing nozzles 12a, 12b and 12c on the first backwashing pipe 3a were connected to the upper end openings of the filter elements 2 whose lower end openings are connected to the backwashing nozzles 13a, 13b and 13c on the second backwashing pipe 3b. However, this is only because FIG. 1 is simplified by omitting the displacement shown in FIGS. 2 and 3, that is, the fact that the location where the first backwashing pipe 3a is coupled to the discharge pipe 11 is displaced from the location where the second backwashing pipe 3b is coupled to the discharge pipe 11 by an appropriate angle. In fact, none of the backwashing nozzles 12 on the first backwashing pipe 3a should be connected to any of the upper end openings of the filter element 2 whose lower end openings are connected to the backwashing nozzles 13 on the second backwashing pipe 3*b* at the same time, as will be described later with reference to FIGS. 4 to 10.

Figure 4:
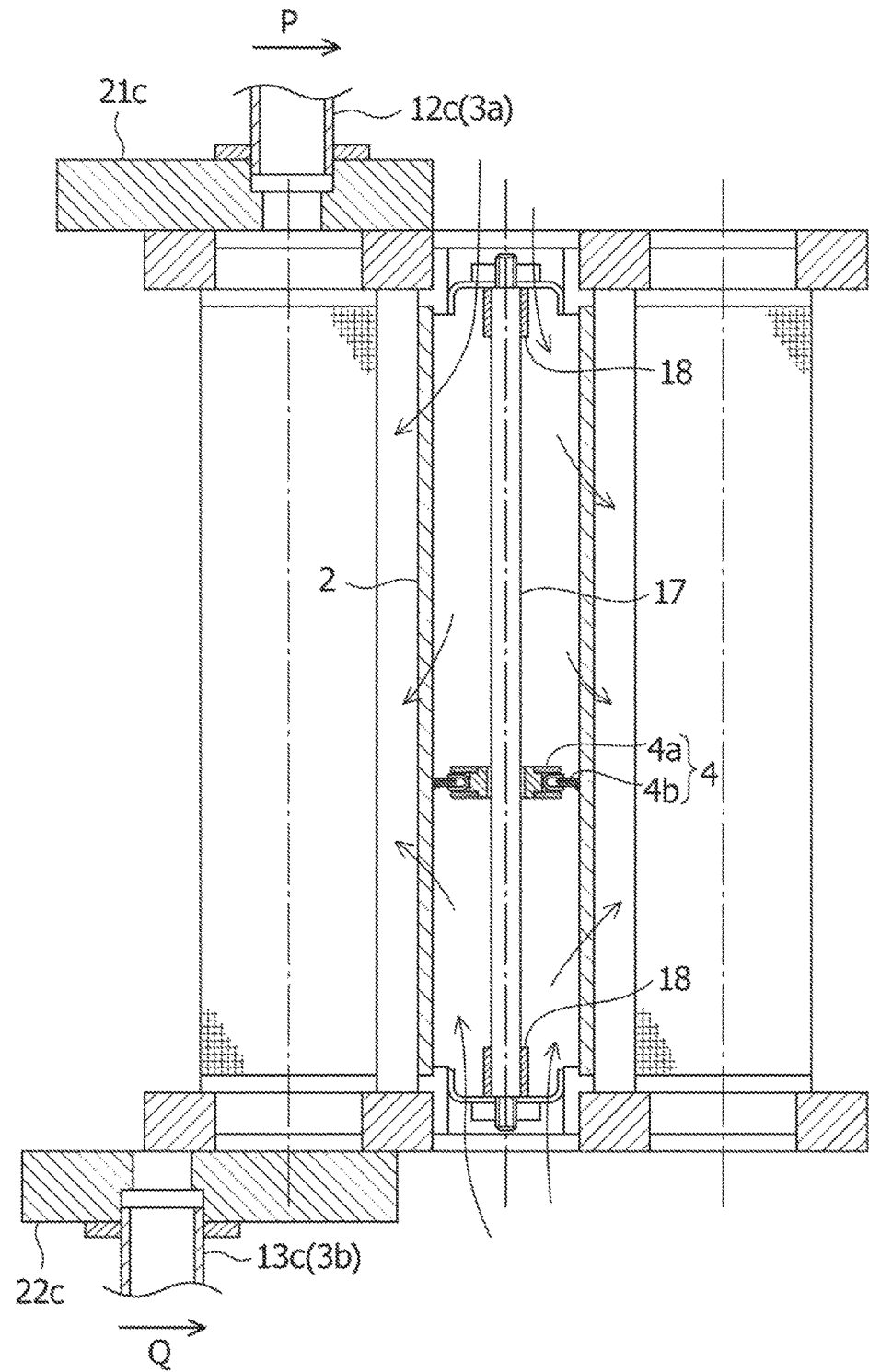
FIG. 4 is an enlarged cross-sectional view of the filtering apparatus according to a first embodiment for illustrating the operations thereof, and shows the condition where one of the filter elements is filtering the fluid, in the state that none of the backwashing nozzles overlaps any of the upper and lower end openings of the filter element.

The trapped object removers 4 are provided in the filter elements 2. Each of the trapped object removers 4 is a removal brush as shown in FIG. 4. When an axial fluid flow is generated in any of the filter elements 2 during filtration or backwashing, the fluid flow moves the trapped object remover 4 in the filter element 2 in the axial direction. Thereby, the outer periphery of each trapped object remover 4 slides in contact with the inner periphery of the corresponding filter element 2, and removes trapped objects from the filter element 2.

Each of the removal brushes 4 is formed by planting bristles 4*b* on the outer periphery of a brush main body 4*a*, and moves up and down in the corresponding filter element 2 along a central axial rod 17 thereof. At the center of the brush main body 4*a*, formed is a hole to which the central axial rod 17 is fitted. The brush main body 4*a* is formed in a donut-shaped disk having a predetermined thickness and an outside diameter smaller than the inner diameter of the filter element 2. The bristles 4*b* are planted in a ring-like pattern on the outer periphery of the brush main body 4*a* so as to slide with their tips in contact with the inner periphery of the corresponding filter element 2. The bristles 4*b* have to be long enough at least to allow their tips to come in contact with the inner periphery of the filter element 2 with a certain pressure.

The bristles 4*b* may be formed of any material widely used as brush bristles, such, for example, as natural or synthetic fibers or metal wires such as steel, copper or brass wires. The bristles 4*b* are flexible enough to be flexed by the pressure of the fluid flow in the filter elements 2. When the bristles 4*b* are flexed by the fluid pressure, the flex creates a gap between the tips of the bristles 4*b* and the inner periphery of the filter element 2, and allows the fluid to flow through the gap.

As shown in FIG. 4, stoppers 18 are mounted on the upper and lower ends of the central axial rod 17 in each of the filter elements 2. The stoppers 18 stop the movement of the corresponding removal brush 4 at the upper and lower ends of the corresponding filter element 2 while the removal brush 4 moves up and down in the filter element 2 along the central axial rod 17. Each stopper 18 is more preferably formed of an impact absorbing material such as rubber or a spring.

As shown in FIG. 1, the backwashing fluid drain pipe 5 is coupled to the discharge side of the backwashing pipes 3*a* and 3*b*, that is, the lower end of the discharge pipe 11. The backwashing fluid drain pipe 5 is formed in a straight pipe extending in a radial direction of the casing 1. The backwashing fluid drain pipe 5 is for discharging, to the outside of the casing 1, trapped objects removed by the trapped object removers 4 that are moved by the fluid flow generated while the filter elements 2 are backwashed. A coupling port portion 19 is provided at the base end of the backwashing fluid drain pipe 5 so as to open upwardly. The lower end of the discharge pipe 11 is coupled to the coupling port portion 19. A discharge port 20 on the distal end of the backwashing fluid drain pipe 5 protrudes to the outside of the casing 1.

The backwashing fluid drain pipe 5 is fixed to the casing 1. At the connection interface between the discharge pipe 11 and the coupling port portion 19 at the base end of the backwashing fluid drain pipe 5, a bearing mechanism and a sealing mechanism are provided. The bearing mechanism, such as a bearing, supports the discharge pipe 11, and the sealing mechanism prevents objects to be discharged from being mixed into an unfiltered fluid. When rotationally driven, the motor 16 rotates the discharge pipe 11 and the first and second backwashing pipes 3*a* and 3*b* in the direction indicated by arrow P by using the coupling port portion 19 as rotational support, with the coupling interface between the discharge pipe 11 and the coupling port portion 19 kept sealed.

The filtering apparatus configured as above filters fluid in the following manner during filtration. First, the fluid to be filtered is supplied through the fluid inlet 6 as indicated by arrow C. Thereby, through the openings at the opposite ends (upper and lower ends) of the filter elements 2, which are provided in parallel to each other between the upper and lower mounting plates 8*a* and 8*b*, the fluid flows into the filter elements 2. The fluid having entered the filter elements 2 is filtered by passing through the filter elements 2 from the inside to the outside. During filtration, the difference in pressure between inside and outside each filter element 2 is preferably set to approximately 0.05 MPa or less. However, such pressure difference may sometimes reach approximately 0.5 MPa at a maximum during filtration. Note that the movement of the removal brushes 4 during filtration will be described later. During filtration, the filter elements 2 trap therein foreign objects such as plankton and algae. The fluid filtered by passing through the filter elements 2 is introduced to the outside through the fluid outlet 7 as indicated by arrow D.

During the backwashing operation for maintaining or restoring the filtering performance of the filter elements 2, the motor 16 is rotationally driven to rotate the shaft 14. Thereby, the shaft 14 rotates the backwashing pipes 3*a* and 3*b* joined thereto so that the backwashing pipes 3*a* and 3*b* can be sequentially connected to the upper and lower end openings of the filter elements 2 at different timings between the backwashing pipes 3*a* and 3*b*. This causes a difference in pressure between inside and outside each filter element 2 to cause the fluid to flow through the filter elements 2 from the inside to the outside. Thereby, the filter elements 2 are cleaned by backwashing. During this backwashing operation, the difference in pressure between inside and outside each filter element 2 may sometimes reach approximately 0.5 MPa at a maximum. The trapped objects removed by backwashing are introduced into the discharge pipe 11, and discharged to the outside as indicated by arrow E through the discharge port 20 of the backwashing fluid drain pipe 5 to which the lower end of the discharge pipe 11 is coupled.

During the backwashing operation, the backwashing pipes 3*a* and 3*b* are sequentially connected to the upper and lower end openings of the filter elements 2 at different timings between the backwashing pipes 3*a* and 3*b*. To enable such an operation, a first embodiment is provided. As shown in FIGS. 2 and 3, in the first embodiment, blind lids 21 and 22 are provided on connecting ports of the backwashing pipes 3*a* and 3*b*. The connecting ports are connected to the opposite end openings of the filter elements 2. Each of the blind lids 21 and 22 is long enough to cover any adjacent two openings of the filter elements 2. In addition, each blind lid 21 extends asymmetrically with respect to the backwashing pipe 3*a*, and each blind lid 22 extends asymmetrically with respect to the backwashing pipe 3*b*. The asymmetric arrangement of the blind lids 21 on the upper ends of the filter elements 2 is the inverse of that of the blind lids 22 on the lower ends of the filter elements 2.

As shown in FIG. 2, which illustrates the upper end structure of the filter elements 2, the blind lids 21*a*, 21*b* and 21*c* are provided to the first backwashing pipe 3*a* shown in FIG. 1. Specifically, the blind lids 21*a*, 21*b* and 21*c* are provided on the connecting ports of the backwashing nozzles 12*a*, 12*b* and 12*c*, respectively. Meanwhile, as shown in FIG. 3, which illustrates the lower end structure of the filter elements 2, the blind lids 22*a*, 22*b* and 22*c* are provided to the second backwashing pipe 3*b* shown in FIG. 1. Specifically, the blind lids 22*a*, 22*b* and 22*c* are provided on the connecting ports of the backwashing nozzles 13*a*, 13*b* and 13*c*, respectively. As shown in FIGS. 2 and 3, each of the blind lids 21*a* to 21*c* and 22*a* to 22*c* is formed in a circular arc plate shape centered at the central axis of the discharge pipe 11 in a plan view. Each blind lid has longer and shorter portions extending in opposite directions from the corresponding backwashing nozzle. The asymmetry due to these longer and shorter portions on the upper end side is the inverse of that on the lower end side.

As described above, the blind lids 21 and 22 are asymmetrically arranged so that the asymmetric arrangement on the upper end side of the filter elements 2 can be the inverse of the asymmetric arrangement on the lower end side thereof. More specifically, the blind lids 21 and 22 are arranged so that, when the connecting ports of the backwashing pipe 3*a* are connected to the upper end openings of any ones of the filter elements 2, the lower end openings of those ones of the filter elements 2 can be closed by the longer portions of the blind lids 22. This configuration allows the backwashing pipes 3*a* and 3*b* to be sequentially connected to the upper and lower end openings of the filter elements 2 at different timings between the backwashing pipes 3*a* and 3*b*.

Next, with reference to FIGS. 4 to 10, the filtering and backwashing operations of the filtering apparatus according to the first embodiment, which is configured as above, will be described. FIGS. 4 to 10 each are an enlarged cross-sectional view integrally including cross-sectional views taken along F-F line of FIG. 2 and G-G line of FIG. 3. FIGS. 4 to 10 each show adjacent three of the filter elements 2 arranged on the third concentric circle from the center in FIGS. 2 and 3. For simplicity, the operations only for the center one of the adjacent three of the filter elements 2 will be described.

FIG. 4 shows the condition where the filter element 2 shown at the center (hereinafter referred to as center filter element 2) is filtering the fluid. In the condition, none of the backwashing nozzles of the first and second backwashing pipes 3*a* and 3*b* overlaps any of the upper and lower end openings of the center filter element 2. Instead, the backwashing nozzles 12*c* and 13 C respectively of the first and second backwashing pipes 3*a* and 3*b* overlap the filter element 2 shown on the left-hand side in FIG. 4. The backwashing for the center filter element 2 has not yet started in FIG. 4. In the condition, the fluid supplied through the fluid inlet 6 shown in FIG. 1 flows in the center filter element 2 through its upper and lower end openings. The fluid having entered the filter element 2 is filtered by passing through the filter element 2 from the inside to the outside. In this event, the upward and downward flows of the unfiltered fluid having entered through the upper and lower end openings push the removal brush 4 provided in the filter element 2 in opposite directions, so that the removal brush 4 stops at a balance point between the pressures of these opposite flows in the filter element 2 such, for example, as at a middle portion.

Figure 5:
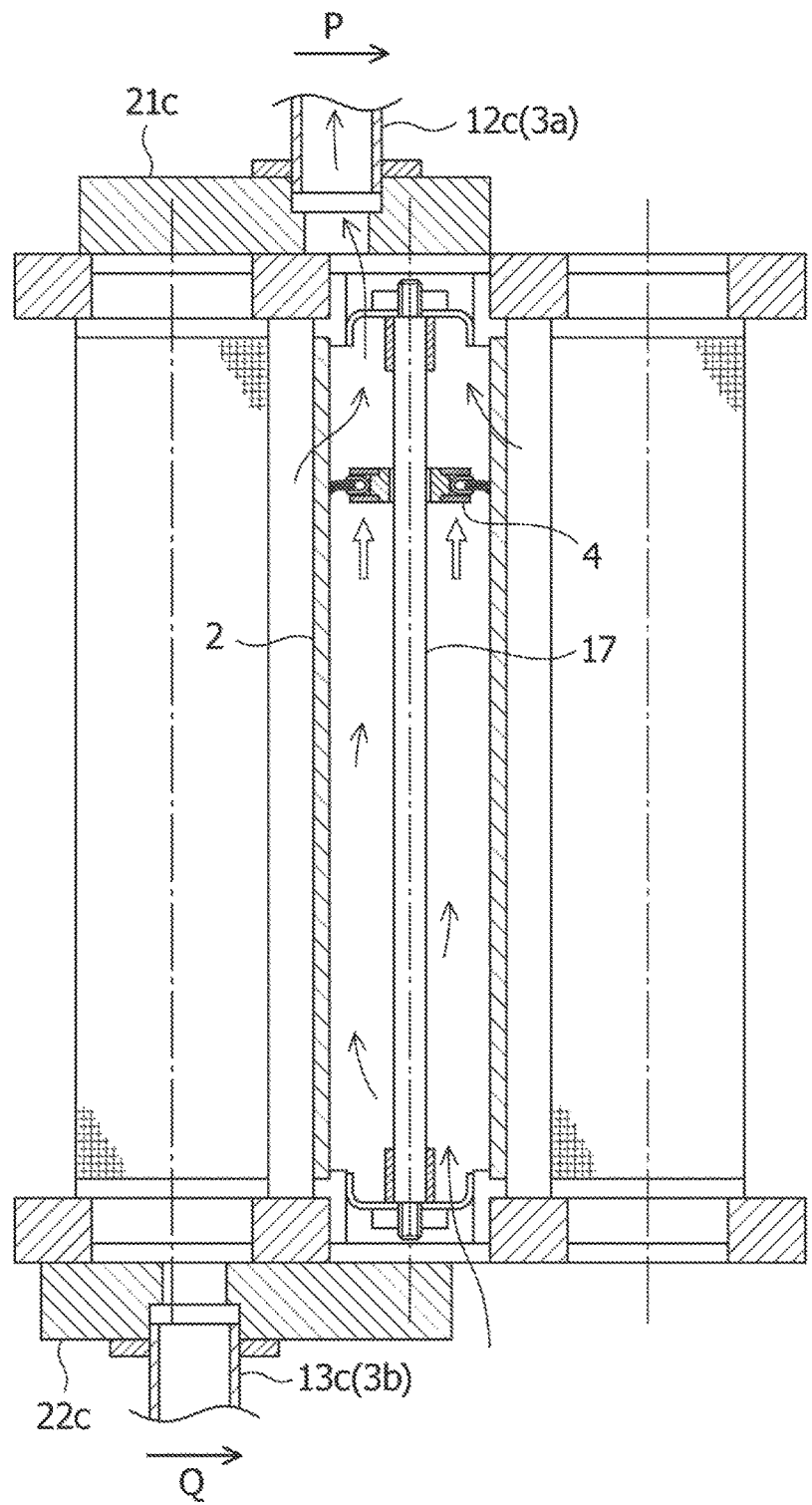
FIG. 5 is an enlarged cross-sectional view of the filtering apparatus for illustrating the operations thereof, and shows the condition where backwashing for the filter element has just started, in the state that the backwashing nozzle partly overlaps the upper end opening of the filter element with the central axis of the backwashing nozzle located to the left off the central axis of the filter element.

FIG. 5 shows the condition where backwashing for the center filter element 2 has just started. The first and second backwashing pipes 3*a* and 3*b* under the condition shown in FIG. 4 rotate in the direction indicated by arrow P of FIG. 2 (identical to the direction indicated by arrow Q of FIG. 3), and shift to the condition shown in FIG. 5. In FIG. 5, the backwashing nozzle 12*c* of the first backwashing pipe 3*a* partly overlaps the upper end opening of the center filter element 2. The central axis of the backwashing nozzle 12*c* is to the left off the central axis of the filter element 2. This condition causes the backwashing nozzle 12*c* to suck the fluid out of the filter element 2, thereby causing the fluid to flow into the backwashing nozzle 12*c* through the upper end opening of the filter element 2. As a result, the fluid starts flowing through the filter element 2 from the outside to the inside, which means that the filter element 2 starts being backwashed. Here, "the backwashing nozzle 12*c* sucks the fluid out of the filter element 2" means that the pressure on the backwashing nozzle 12*c* side is lower than the internal pressure of the filter element 2, and that this pressure difference causes the fluid to flow toward the backwashing nozzle 12*c*. Accordingly, as used herein, the phrases like "the backwashing nozzle sucks the fluid out" shall hereinafter mean that "the pressure difference causes the fluid to flow toward the backwashing nozzle."

At that time, the lower end opening of the center filter element 2 is not completely closed by the blind lid 22*c*, which is provided around the backwashing nozzle 13*c* of the second backwashing pipe 3*b*. Thus, the unfiltered fluid flows into the filter element 2 through the gap. The influx of the unfiltered fluid creates an upward flow, and this upward flow pushes the removal brush 4 in the filter element 2 upward along the central axial rod 17. As a result, the bristles 4*b* on the outer periphery of the removal brush 4 slide in contact with the inner periphery of an upper portion of the filter element 2 to remove objects trapped and adhered to the inner periphery.

Figure 6:
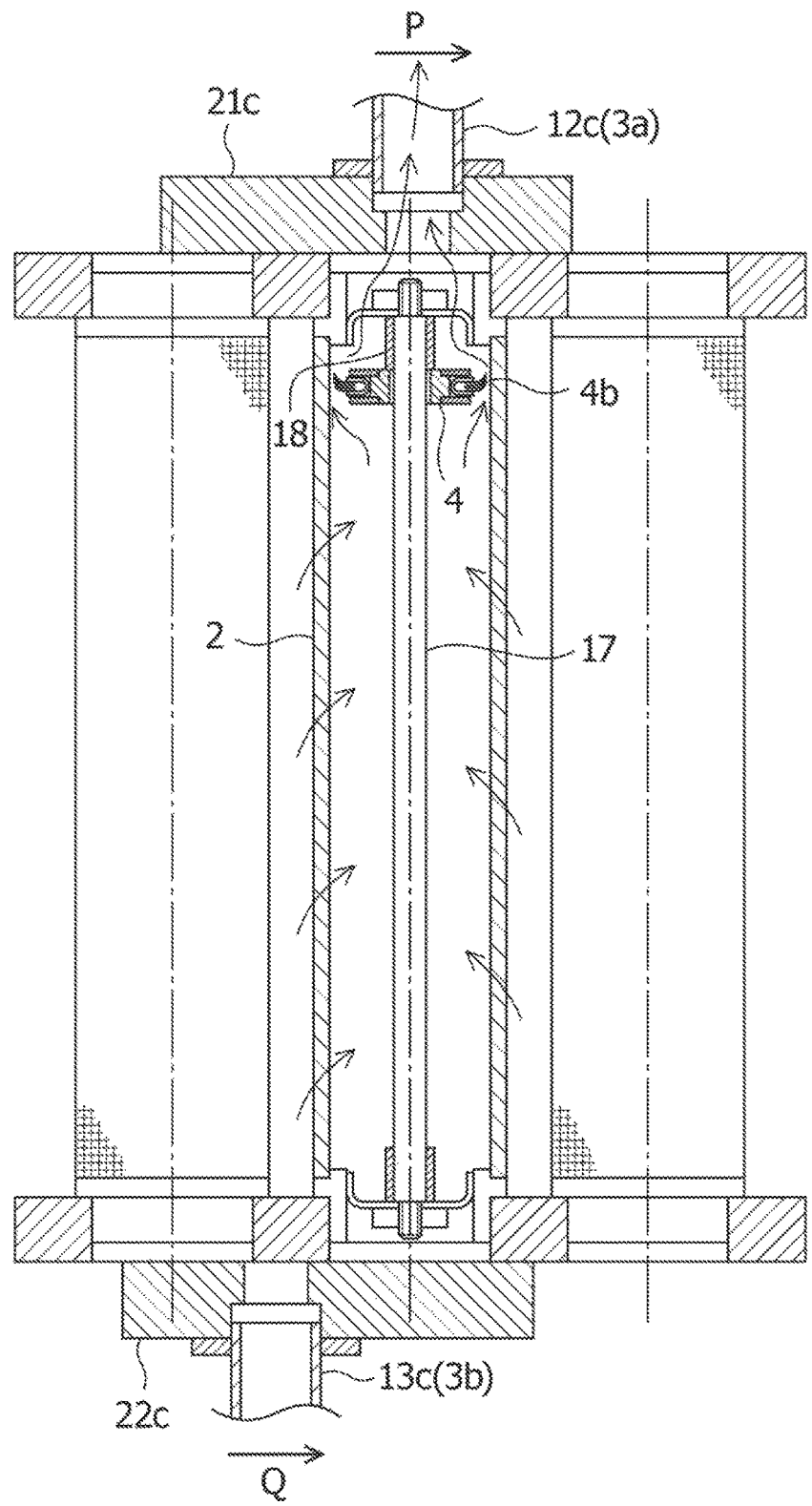
FIG. 6 is an enlarged cross-sectional view of the filtering apparatus for illustrating the operations thereof, and shows the condition where the filter element is being backwashed, in the state that the backwashing nozzle is connected to the upper end opening of the filter element with their central axes coinciding with each other, and that the lower end opening of the filter element is completely closed by the blind lid provided around another backwashing nozzle.

FIG. 6 shows the condition where the center filter element 2 is being backwashed. The first and second backwashing pipes 3*a* and 3*b* under the condition shown in FIG. 5 rotate in the same direction as the above, and shift to the condition shown in FIG. 6. In FIG. 6, the backwashing nozzle 12*c* of the first backwashing pipe 3*a* is connected to the upper end opening of the center filter element 2 with their central axes coinciding with each other. The lower end opening of the filter element 2 is completely closed by the blind lid 22*c* provided around the backwashing nozzle 13*c* of the second backwashing pipe 3*b*. This condition causes the backwashing nozzle 12*c* to suck the fluid out of the filter element 2, thereby causing the fluid to flow into the first backwashing pipe 3*a* through the upper end opening of the filter element 2. As a result, the fluid flows through the filter element 2 from the outside to the inside, which means that the filter element 2 is still being backwashed. At that time, since the lower end opening of the filter element 2 is completely closed by the blind lid 22*c*, an outside-in fluid flow is created on the lower-end side of the filter element 2, and pushes the removal brush 4 upward along the central axial rod 17 till the removal brush 4 collides with the stopper 18 at the upper end of the filter element 2. As a result, the removal brush 4 stops at its uppermost position.

The removal brush 4 that stops after colliding with the stopper 18 narrows the flow channel in the filter element 2. Accordingly, most of the pressure (backwashing pressure) due to the backwashing fluid flow is applied on the removal brush 4. This backwashing pressure flexes the bristles 4*b* that have been abutted on the inner periphery of the filter element 2, and creates a gap between the bristles 4*b* and the inner periphery of the filter element 2. As a result, backwashing fluid flows into the backwashing nozzle 12*c* through the upper end opening of the filter element 2. Thereby, the trapped objects that the removal brush 4 has removed from the inner periphery of the filter element 2 while moving as shown in FIG. 5 flow into the first backwashing pipe 3*a* through the backwashing nozzle 12*c*. After that, the trapped and removed objects and the backwashing fluid are introduced through the discharge pipe 11 shown in FIG. 1 into the backwashing fluid drain pipe 5, and discharged to the outside.

Figure 7:
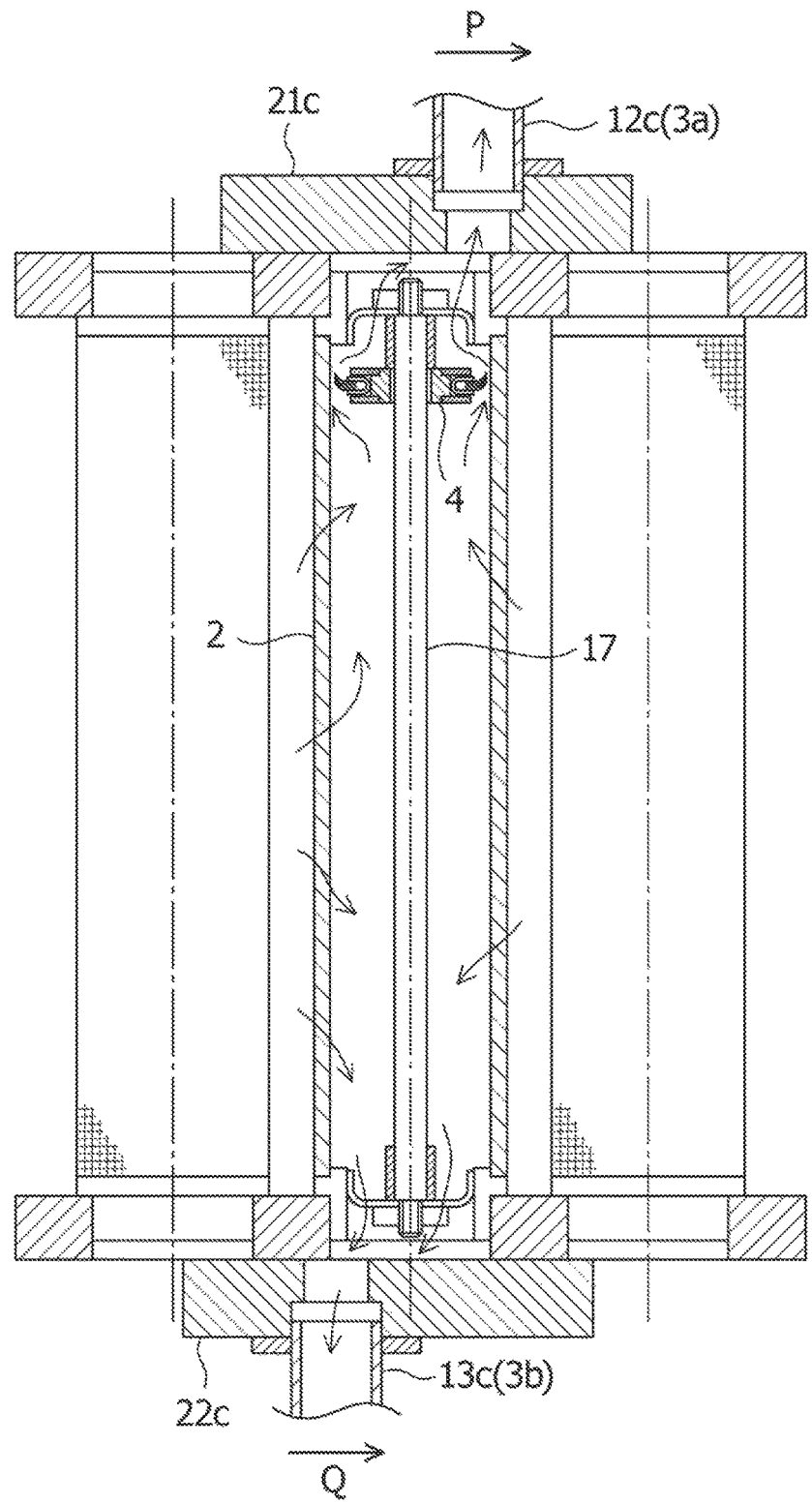
FIG. 7 is an enlarged cross-sectional view of the filtering apparatus for illustrating the operations thereof and shows the instantaneous condition where the filter element 2 is being backwashed from both of its upper and lower end openings, in the state that the backwashing nozzle partly overlaps the upper end opening of the filter element with the central axis of the backwashing nozzle located to the right off the central axis of the filter element 2, while another backwashing nozzle partly overlaps the lower end opening of the filter element with the central axis of the backwashing nozzle located to the left off the central axis of the filter element.

FIG. 7 shows the instantaneous condition where the center filter element 2 is being backwashed from both of its upper and lower end openings. The first and second backwashing pipes 3*a* and 3*b* under the condition shown in FIG. 6 rotate in the same direction as the above, and shift to the condition shown in FIG. 7. In FIG. 7, the backwashing nozzle 12*c* of the first backwashing pipe 3*a* partly overlaps the upper end opening of the center filter element 2 with the central axis of the backwashing nozzle 12*c* located to the right off the central axis of the filter element 2. The backwashing nozzle 13*c* of the second backwashing pipe 3*b* partly overlaps the lower end opening of the filter element 2 with the central axis of the backwashing nozzle 13*c* located to the left off the central axis of the filter element 2. This condition causes the backwashing nozzle 12*c* to suck the fluid out of the filter element 2, thereby causing the fluid to flow into the first backwashing pipe 3*a* through the upper end opening of the filter element 2. In addition, the condition causes the backwashing nozzle 13*c* to suck the fluid out of the filter element 2, thereby causing the fluid to flow into the second backwashing pipe 3*b* through the lower end opening of the filter element 2. As a result, the fluid flows through the filter element 2 from the outside to the inside, which means that the filter element 2 is still being backwashed under this condition. The operation performed under the condition shown in FIG. 7 is similar to that in FIG. 6 except for the above points.

Figure 8:
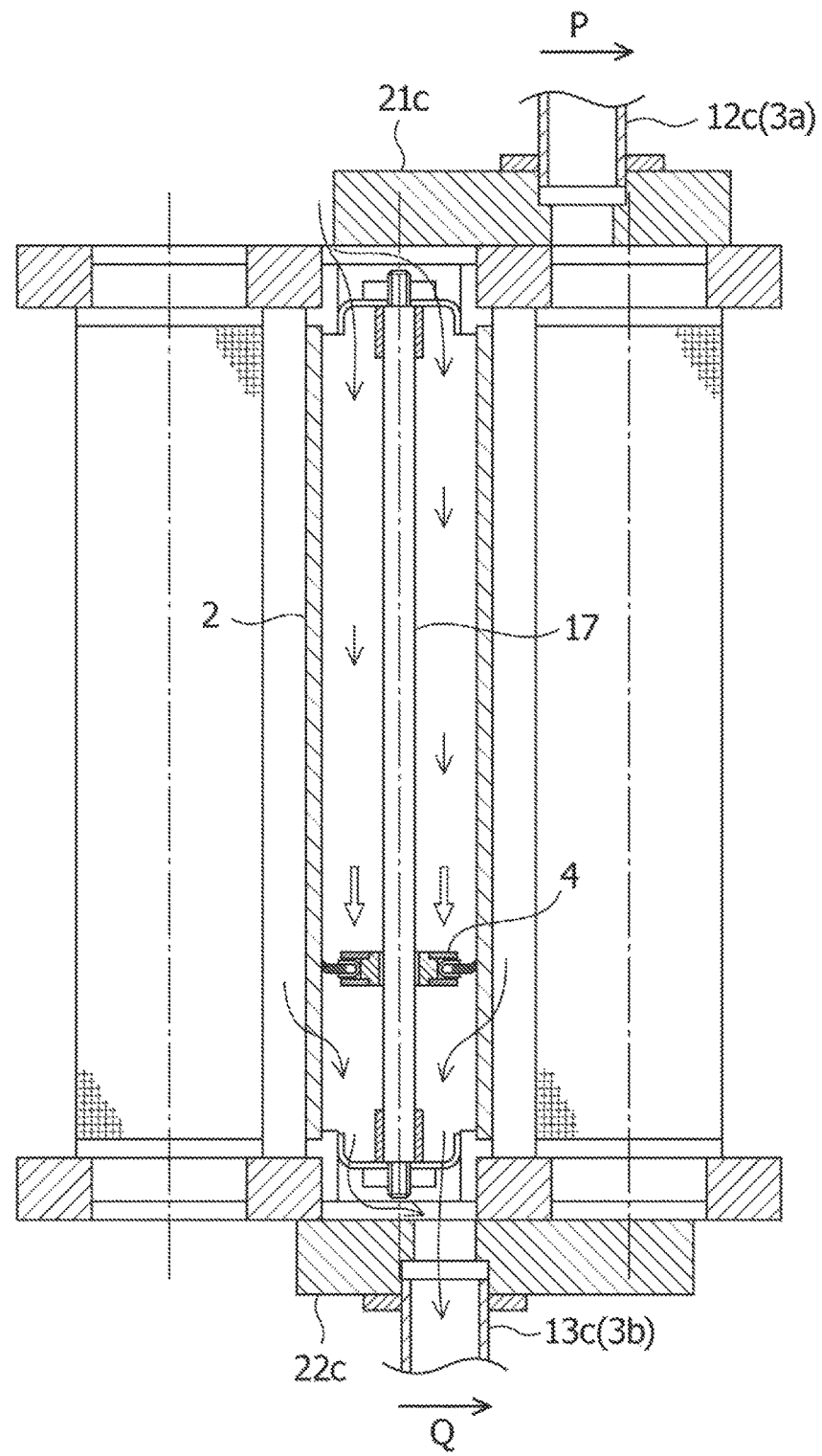
FIG. 8 is an enlarged cross-sectional view of the filtering apparatus for illustrating the operations thereof, and shows the condition where the filter element is being backwashed from its lower end, in the state that the backwashing nozzle partly overlaps the lower end opening of the filter element with the central axis of the backwashing nozzle located to the right off the central axis of the filter element.

FIG. 8 shows the condition where the center filter element 2 is being backwashed from its lower end. The first and second backwashing pipes 3*a* and 3*b* under the condition shown in FIG. 7 rotate in the same direction as the above, and shift to the condition shown in FIG. 8. In FIG. 8, the backwashing nozzle 13*c* of the second backwashing pipe 3*b* partly overlaps the lower end opening of the filter element 2 with the central axis of the backwashing nozzle 13*c* located to the right off the central axis of the filter element 2. This condition causes the backwashing nozzle 13*c* to suck the fluid out of the filter element 2, thereby causing the fluid to flow into the backwashing nozzle 13*c* through the lower end opening of the filter element 2. As a result, the fluid flows through the filter element 2 from the outside to the inside, which means that backwashing for the filter element 2 has just started from its lower end. At that time, since the blind lid 21*c* provided around the backwashing nozzle 12*c* of the first backwashing pipe 3*a* has moved in the direction indicated by arrow P, the upper end opening of the filter element 2 is partly opened. Thus, the unfiltered fluid flows into the filter element 2 through the gap between the blind lid 21*c* and the upper end opening. The influx of the unfiltered fluid creates a downward flow, and this downward flow pushes the removal brush 4 in the filter element 2 downward along the central axial rod 17. As a result, the bristles 4*b* on the outer periphery of the removal brush 4 slide in contact with the inner periphery of a lower portion of the filter element 2 to remove objects trapped and adhered to the inner periphery.

Figure 9:
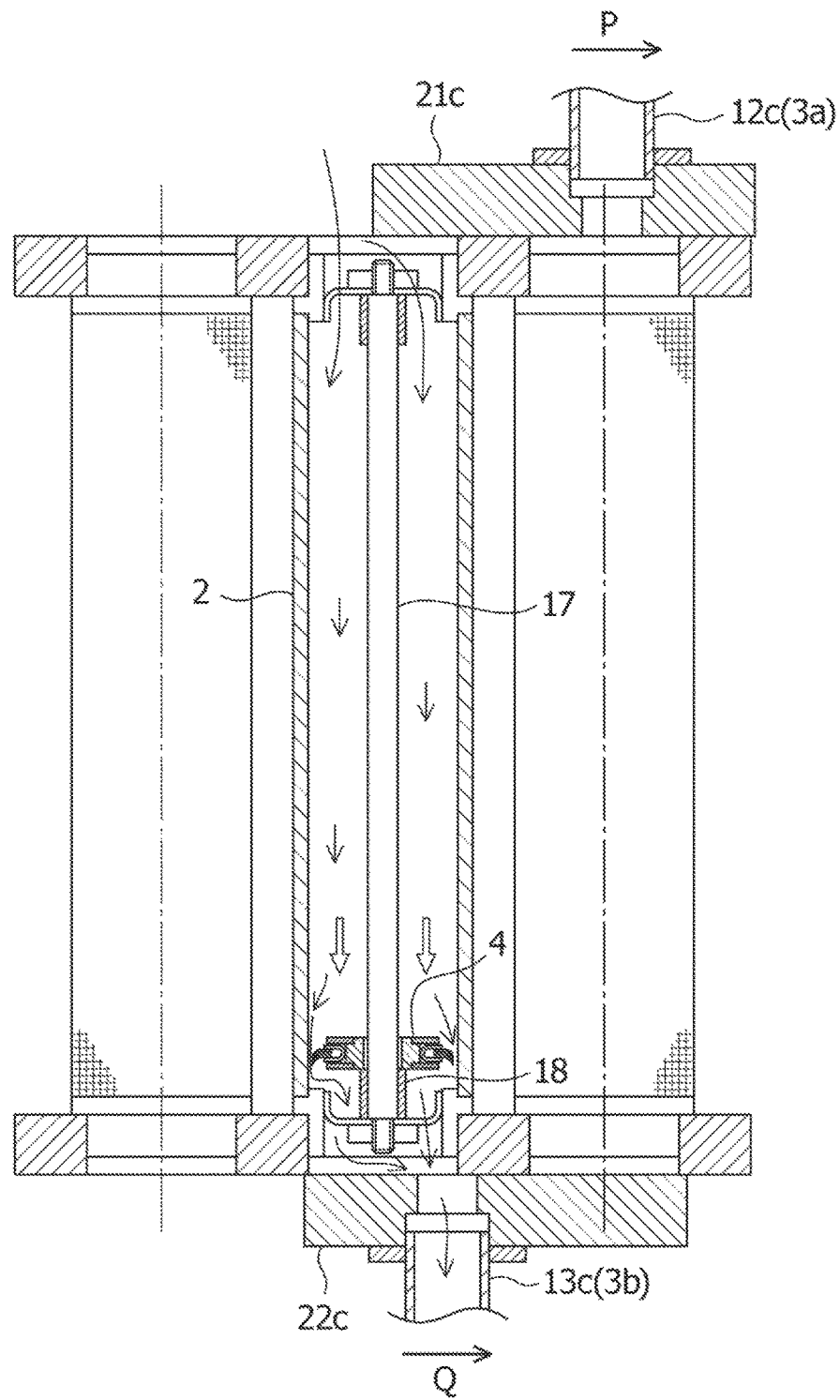
FIG. 9 is an enlarged cross-sectional view of the filtering apparatus for illustrating the operations thereof, and shows the condition where the filter element is still being backwashed from its lower end, in the state that the backwashing nozzle partly overlaps the lower end opening of the filter element with the central axis of the backwashing nozzle located to the right off the central axis of the filter element.

FIG. 9 shows the condition where the center filter element 2 is still being backwashed from its lower end. The first and second backwashing pipes 3*a* and 3*b* under the condition shown in FIG. 8 rotate in the same direction as the above, and shift to the condition shown in FIG. 9. In FIG. 9, the backwashing nozzle 13*c* of the second backwashing pipe 3*b* partly overlaps the lower end opening of the filter element 2 with the central axis of the backwashing nozzle 13*c* located to the right off the central axis of the filter element 2. This condition causes the fluid in the filter element 2 to flow into the backwashing nozzle 13*c* through the lower end opening of the filter element 2. At that time, since the blind lid 21*c* provided around the backwashing nozzle 12*c* of the first backwashing pipe 3*a* has moved in the direction indicated by arrow P, the upper end opening of the filter element 2 is half-opened. Thus, the unfiltered fluid flows into the filter element 2 through this opening. The influx of the unfiltered fluid creates a downward flow, and this downward flow pushes the removal brush 4 in the filter element 2 downward along the central axial rod 17 till the removal brush 4 collides with the stopper 18 at the lower end. As a result, the removal brush 4 stops at its lowermost position.

The removal brush 4 that stops after colliding with the stopper 18 narrows the flow channel in the filter element 2. Accordingly, most of the pressure (backwashing pressure) due to the backwashing fluid flow is applied on the removal brush 4. This backwashing pressure flexes the bristles 4*b* that have been abutted on the inner periphery of the filter element 2, and creates a gap between the bristles 4*b* and the inner periphery of the filter element 2. As a result, the backwashing fluid flows into the backwashing nozzle 13*c* through the lower end opening of the filter element 2. Thereby, the trapped objects that the removal brush 4 has removed from the inner periphery of the filter element 2 while moving as shown in FIG. 8 flow into the second backwashing pipe 3*b* through the backwashing nozzle 13*c*. After that, the trapped and removed objects and the backwashing fluid are introduced through the discharge pipe 11 shown in FIG. 1 into the backwashing fluid drain pipe 5, and discharged to the outside.

Figure 10:
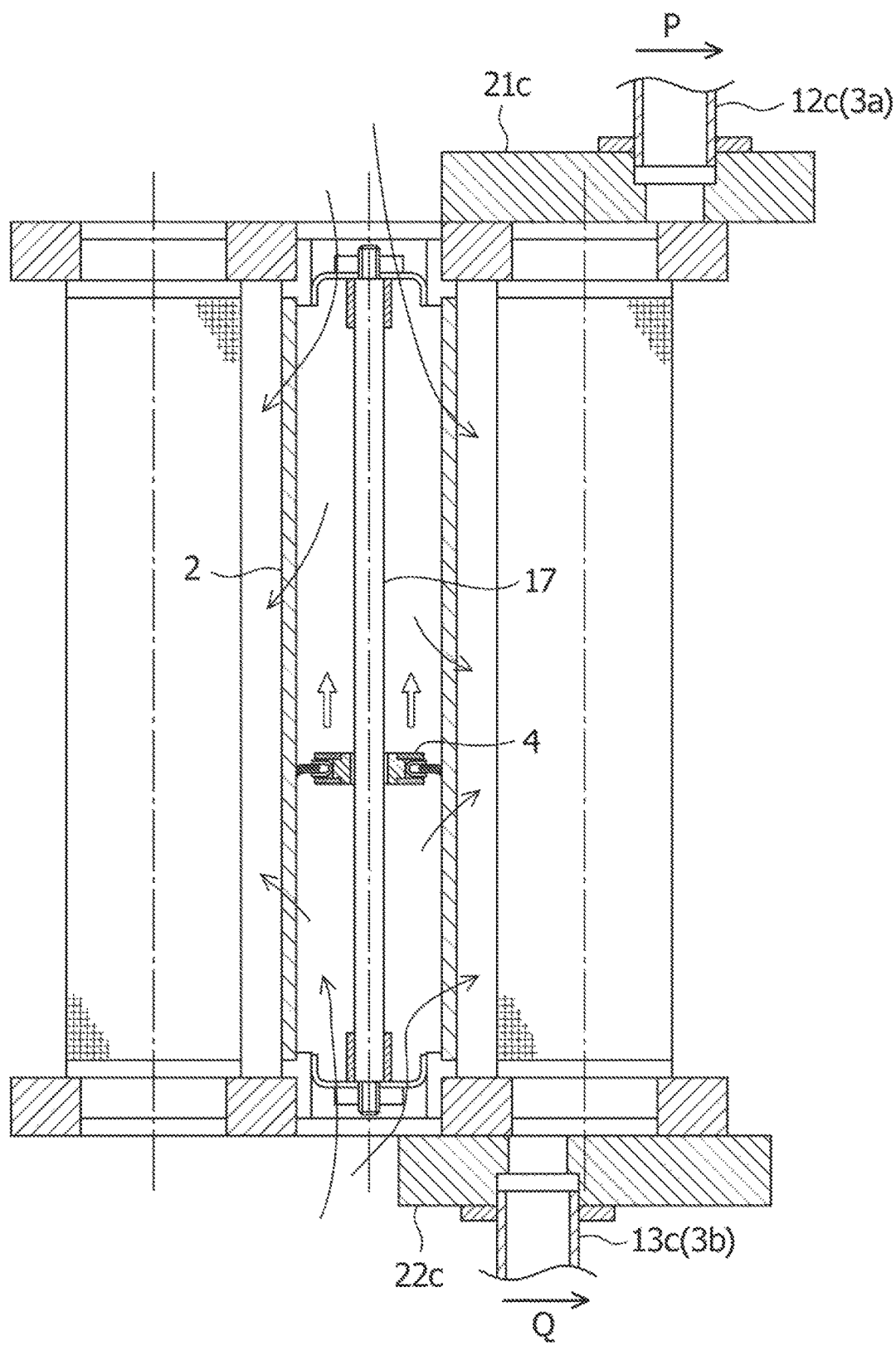
FIG. 10 is an enlarged cross-sectional view of the filtering apparatus for illustrating the operations thereof, and shows the condition where the filter element is filtering the fluid, in the state that none of the backwashing nozzles overlaps any of the upper and lower end openings of the filter element.

FIG. 10 shows the condition where the center filter element 2 is filtering the fluid. The first and second backwashing pipes 3*a* and 3*b* under the condition shown in FIG. 9 rotate in the same direction as the above, and shift to the condition shown in FIG. 10. In this condition, none of the backwashing nozzles of the first and second backwashing pipes 3*a* and 3*b* overlaps any of the upper and lower end openings of the center filter element 2. Instead, the backwashing nozzles 12*c* and 13 C respectively of the first and second backwashing pipes 3*a* and 3*b* overlap the filter element 2 shown on the right-hand side in FIG. 4 (hereinafter referred to as right filter element 2). The right filter element 2 is being backwashed in FIG. 10. In the condition, the blind lid 21*c*, which is provided around the backwashing nozzle 12*c* of the first backwashing pipe 3*a*, does not cover the upper end opening of the center filter element 2. Also, the blind lid 22*c*, which is provided around the backwashing nozzle 13*c* of the second backwashing pipe 3*b*, does not cover the lower end opening of the center filter element 2. Thus, the fluid supplied through the fluid inlet 6 shown in FIG. 1 flows in the center filter element 2 through its upper and lower end openings. The fluid having entered the filter element 2 is filtered by passing through the filter element 2 from the inside to the outside. In this event, the upward fluid flow having entered through the lower end opening pushes up the removal brush 4 provided in the filter element 2 from the position shown in FIG. 9. In addition, the downward fluid flow having entered through the upper end opening pushes down the removal brush 4. As a result, the removal brush 4 stops at a balance point between the pressures of these opposite flows in the filter element 2 such, for example, as at a middle portion.

After that, the filtering and backwashing operations shown in FIGS. 4 to 10 are performed in each of the filter elements 2. Hereinabove, the operations only in the center one of the adjacent three of the filter elements 2 shown in FIGS. 4 to 10 has been described. However, the same filtering and backwashing operations as those for the center filter element 2 are sequentially performed in each of the left and right ones of these adjacent three of the filter elements 2 as the first and second backwashing pipes 3a and 3b rotate in the direction indicated by arrow P of FIG. 2 (identical to the direction indicated by arrow Q of FIG. 3).

Figure 11:
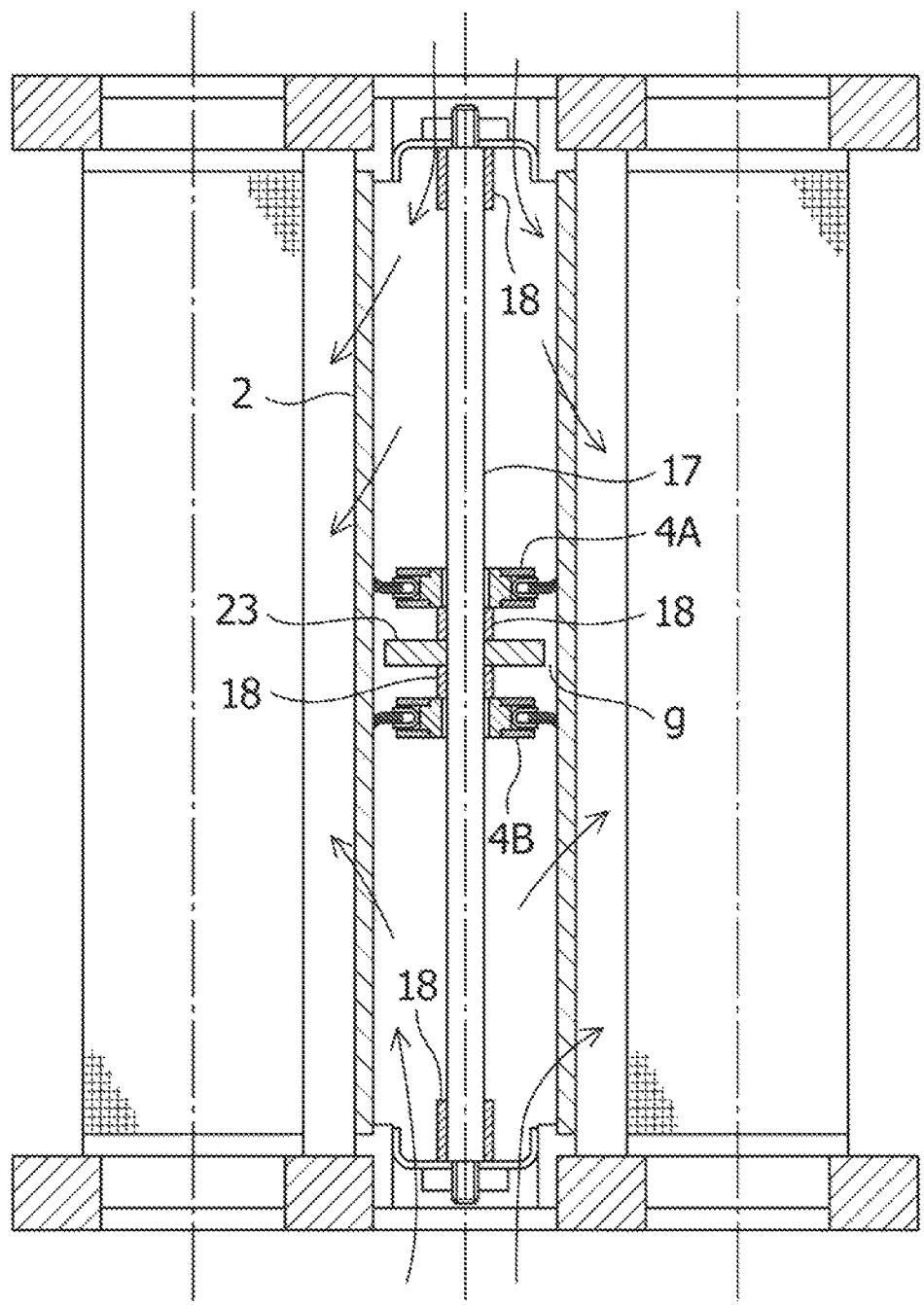
FIG. 11 is an enlarged cross-sectional view of the filtering apparatus according to a second embodiment for illustrating the operations thereof, and shows the condition where one of the filter elements is filtering the fluid, in the state that none of the backwashing nozzles overlaps any of the upper and lower end openings of the filter element.

FIG. 11 is an enlarged view of the main part of a filtering apparatus according to a second embodiment. In this embodiment, each of the filter elements 2 is provided with a partition member 23 and two trapped object removers 4. The partition member 23 is provided at a middle portion in the longitudinal direction of the filter element 2 (at the midpoint of its length, for example). The partition member 23 has a structure capable of restricting the fluid flow in the corresponding filter element 2 while allowing part of the fluid to flow therethrough. The trapped object removers 4 are provided on the opposite sides, that is, the upper opening side and the lower opening side, of the partition member 23 in the filter element 2.

Each of the partition members 23 provides, at the middle portion of the corresponding filter element 2, a resistance to the fluid flow (fluid flow during backwashing, in particular) therein. The partition member 23 is formed in a circular disk having an outside diameter smaller than the inner diameter of the filter element 2. The partition member 23 is fixed to the central axial rod 17 at, for example, the midpoint in the longitudinal direction thereof. In addition, the stoppers 18 are attached to the central axial rod 17 on the upper and lower sides of the partition member 23. Between the outer periphery of the partition member 23 and the inner periphery of the filter element 2, a gap g is formed. The gap g allows part of the fluid to flow upwardly and downwardly through the partition member 23 in the filter element 2.

Figure 12:
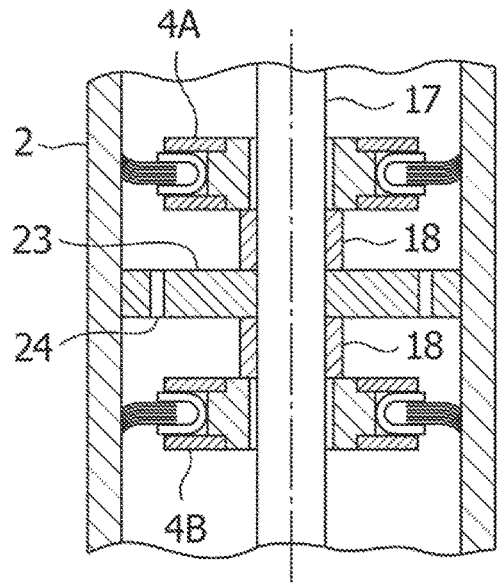
FIG. 12 is an enlarged cross-sectional view of the main part of the filtering apparatus for illustrating another example of the partition member.

Note that the structure of each of the partition members 23 is not limited to that shown in FIG. 11. Alternatively, the partition member 23 may be formed in a circular disk having one or more orifices 24 and an outside diameter as large as the inner diameter of the filter elements 2 so as to block the fluid flow, as shown in FIG. 12. The orifices 24 are provided at appropriate points in each of the circular disk-like partition members 23, and allow part of the fluid to flow through upwardly and downwardly through the partition member 23 in the corresponding filter element 2. Two or more orifices 24 are preferably provided in the vicinity of the outer periphery of each of the circular disk-like partition members 23 with a predetermined distance away from each other in the circumferential direction.

In addition, in the filter element 2, the first trapped object remover 4A is provided on the upper opening side of the partition member 23, and the second trapped object remover 4B is provided on the side, closer to the lower opening side, of the partition member 23, as shown in FIG. 11. Each of these trapped object removers 4A and 4B is a removal brush shown in FIG. 4 described above, which is formed by planting bristles 4b on the outer periphery of a brush main body 4a. The first removal brush (4A) moves up and down between the stopper 18 on the upper side of the partition member 23 and the stopper 18 at the upper end of the filter element 2. The second removal brush (4B) moves up and down between the stopper 18 on the lower side of the partition member 23 and the stopper 18 at the lower end of the filter element 2.

In the first embodiment, the blind lids 21 and 22 are provided around the backwashing nozzles 12 and 13 of the backwashing pipes 3a and 3b as shown in FIGS. 2 and 3. In contrast, the blind lids 21 and 22 do not have to be provided in the filtering apparatus according to the second embodiment shown in FIG. 11. This is because the partition members 23 shown in FIG. 11 are alternatives to the blind lids 21 and 22. As will be described later, each of the partition members 23 allows for the creation of the backwashing flow which travels from the outside to the inside through the corresponding filter element 2.

Figure 13:
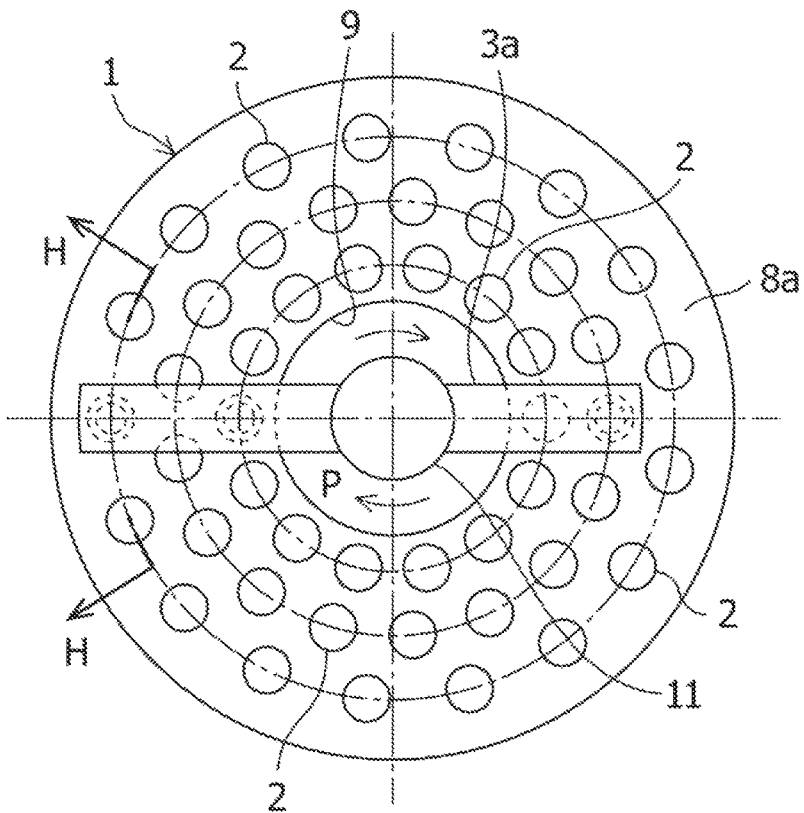
FIG. 13 is a cross-sectional view of the filtering apparatus according to the second embodiment taken along A-A line of FIG. 1.
Figure 14:
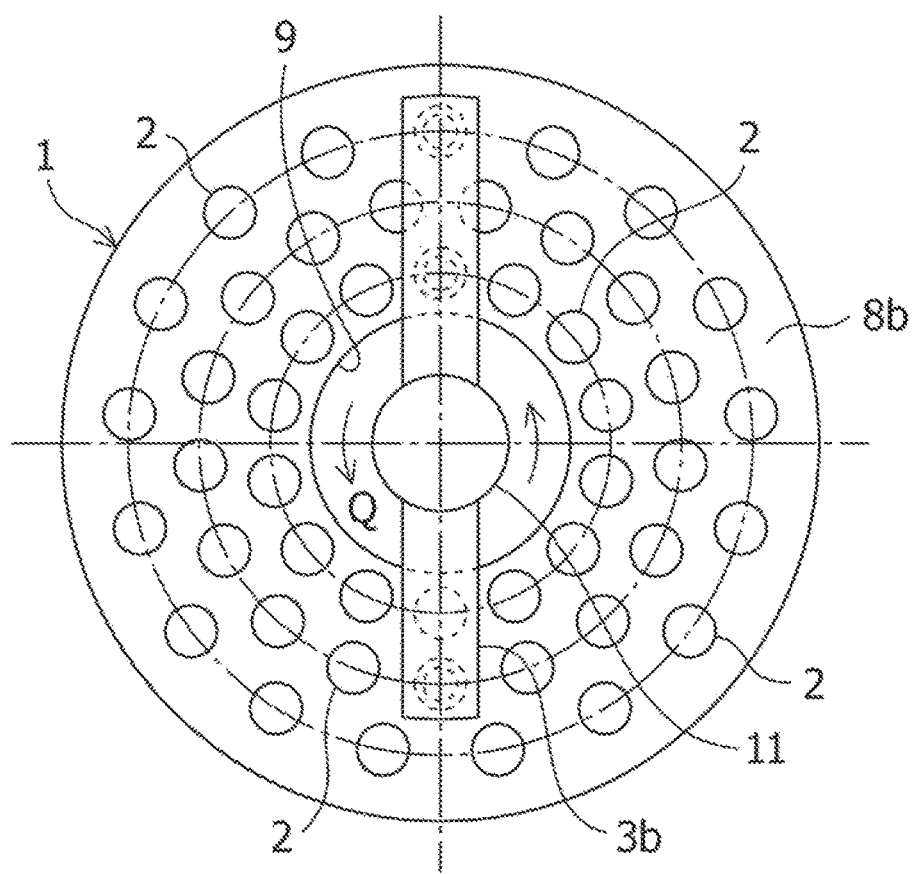
FIG. 14 is a cross-sectional view of the filtering apparatus according to the second embodiment taken along B-B line of FIG. 1.

In this case, as shown in FIGS. 13 and 14, the location where the first backwashing pipe 3a is coupled to the upper end of the discharge pipe 11 is displaced from the location where the second backwashing pipe 3b is coupled to the lower end of the discharge pipe 11 by an angle (90°, for example) appropriately set according to the arrangement pitches of the filter elements 2. Accordingly, when the motor 16, shown in FIG. 1, is rotationally driven to rotate the first and second backwashing pipes 3a and 3b, the backwashing nozzles 12 on the first backwashing pipe 3a are sequentially connected to the upper end openings of the filter elements 2 while the backwashing nozzles 13 on the second backwashing pipe 3b are sequentially connected to the lower end openings of the filter elements 2 at different timings from the backwashing pipe 3a. This configuration prevents each of the filter elements 2 from being backwashed simultaneously from its upper and lower end openings. The displacement between the locations where the first and second backwashing pipes 3a and 3b are coupled to the discharge pipe 11 is not limited to 90°. The displacement may be appropriately set according to the arrangement pitches of the filter elements to any angle that prevents each of the filter elements 2 from being backwashed simultaneously from its upper and lower end openings. For example, the displacement may be 30°, 45° or 60°.

Figure 15:
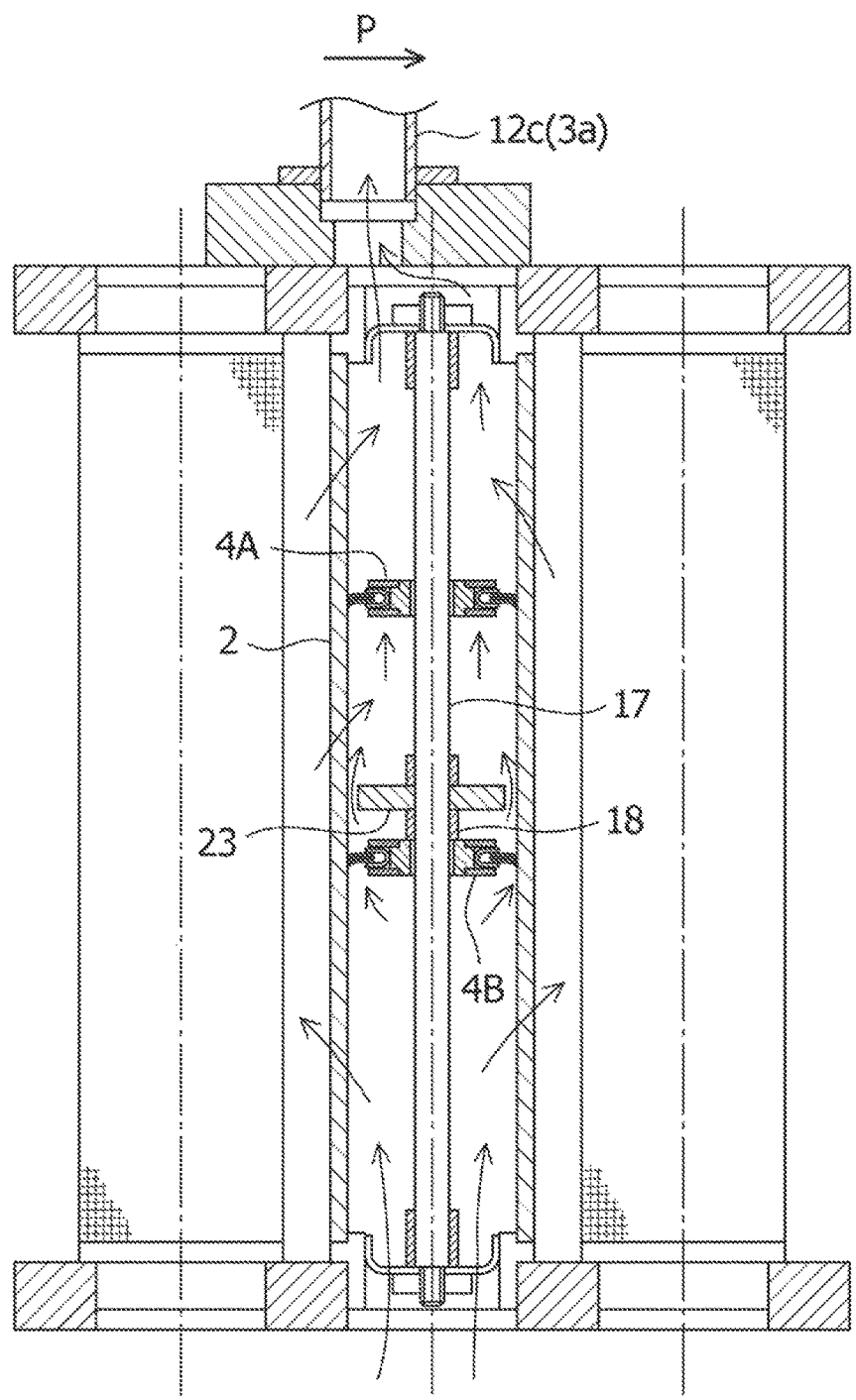
FIG. 15 is an enlarged cross-sectional view of the filtering apparatus according to the second embodiment for illustrating the operations thereof, and shows the condition where backwashing for the upper portion of the filter element has just started, in the state that the backwashing nozzle overlaps the upper end opening of the filter element with the central axis of the backwashing nozzle located to the left off the central axis of the filter element.
Figure 16:
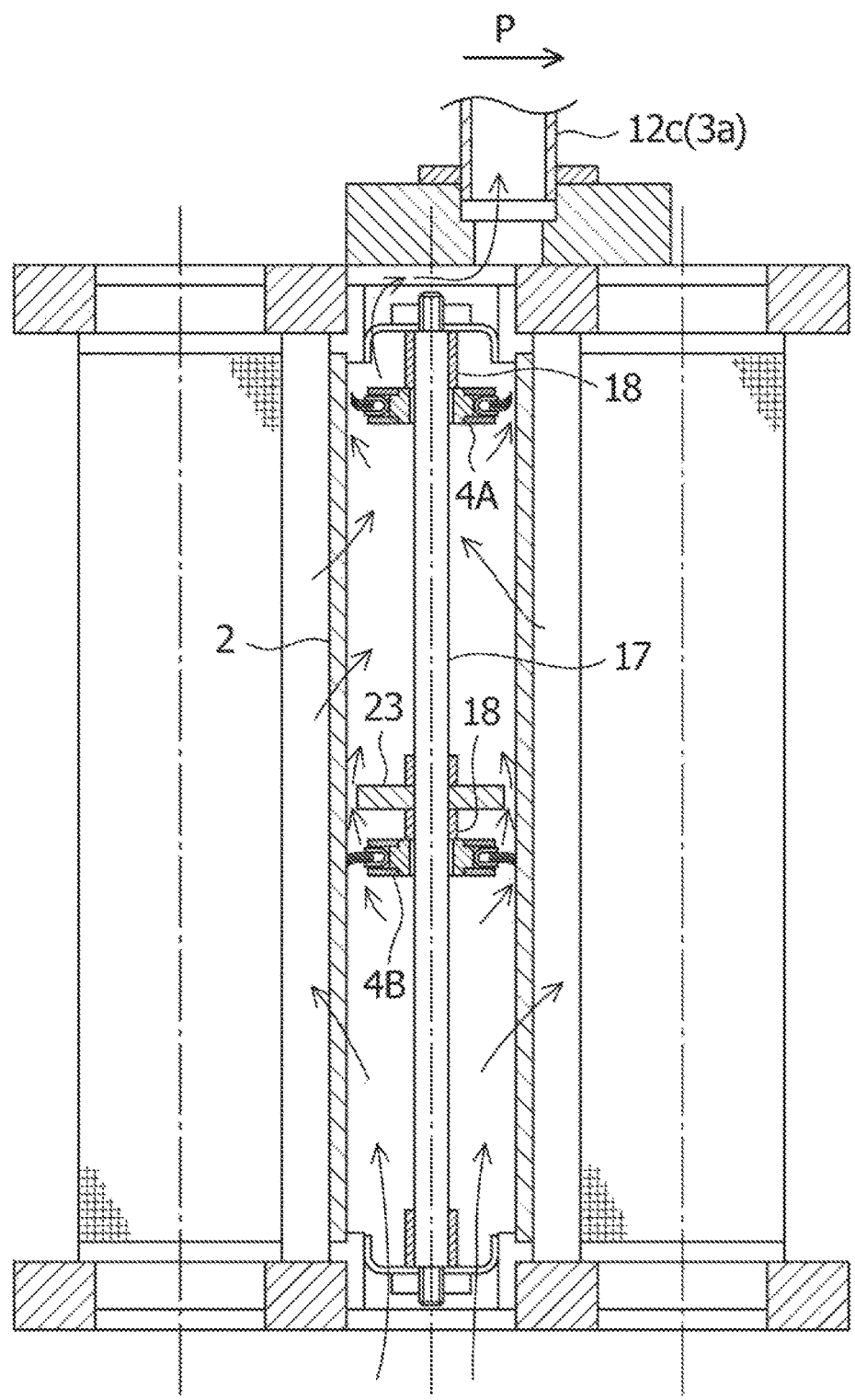
FIG. 16 is an enlarged cross-sectional view of the filtering apparatus for illustrating the operations thereof, and shows the condition where the upper portion of the filter element is still being backwashed, in the state that the backwashing nozzle partly overlaps the upper end opening of the filter element with the central axis of the backwashing nozzle located to the right off the central axis of the filter element.
Figure 17:
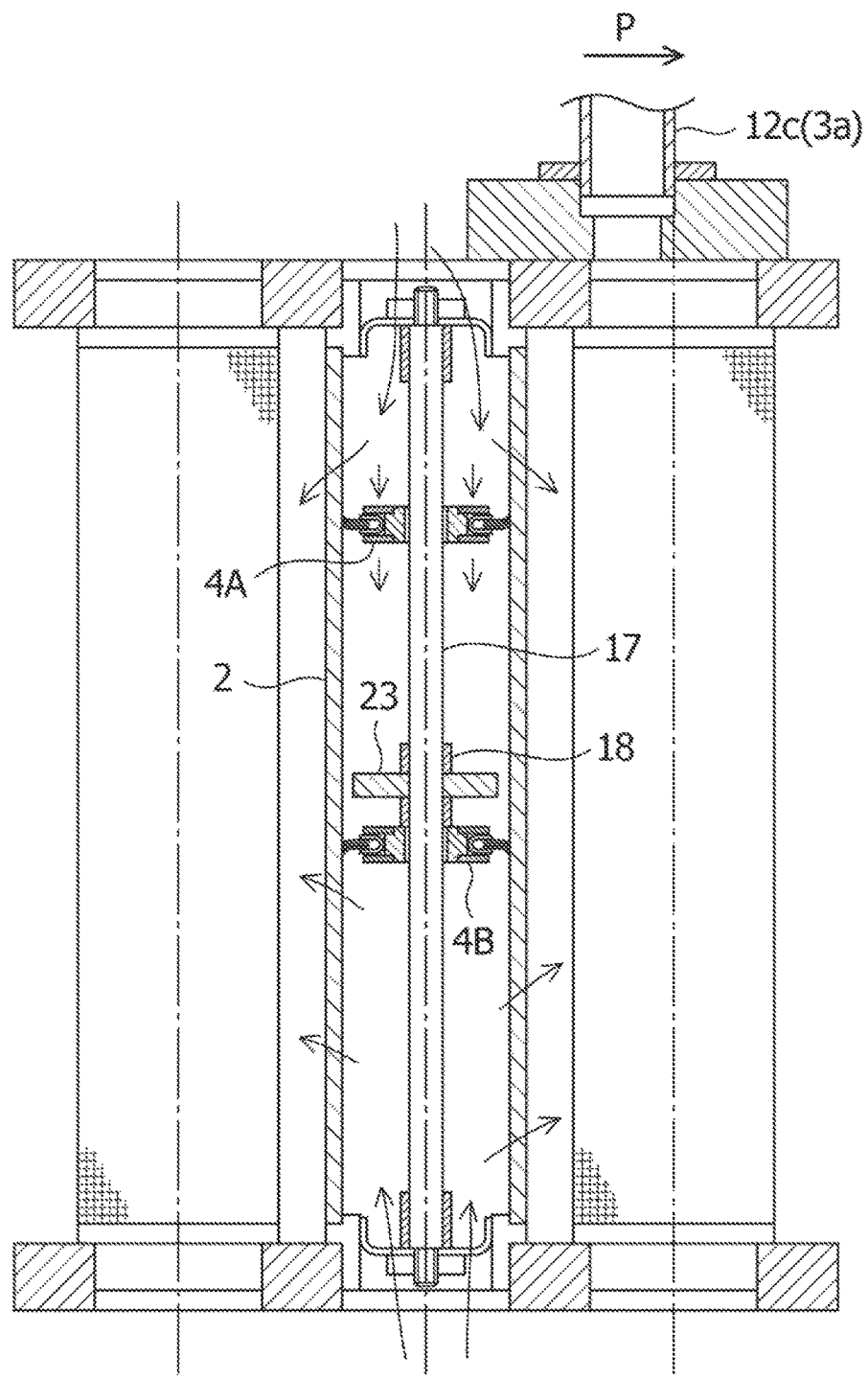
FIG. 17 is an enlarged cross-sectional view of the filtering apparatus for illustrating the operations thereof, and shows the condition where the filter element is filtering the fluid, in the state that the backwashing nozzle comes off the upper end opening of the filter element, so that the backwashing operation ends.

Next, with reference to FIGS. 15 to 17, the filtering and backwashing operations of the filtering apparatus according to the second embodiment, which is configured as above, will be described. FIGS. 11 and 15 to 17 each are an enlarged cross-sectional view taken along H-H line of FIG. 13. FIGS. 11 and 15 to 17 each show adjacent three of the filter elements 2 arranged on the third concentric circle from the center in FIG. 13. For simplicity, the operations only for the center one of the adjacent three of the filter elements 2 will be described. The timing when the backwashing nozzle 12 on the first backwashing pipe 3a is connected to the upper end opening of each of the filter elements 2 is different from the timing when the backwashing nozzle 13 on the second backwashing pipe 3b is connected to the lower end opening of the filter element 2. Thus, the backwashing nozzles 12 and 13 are not simultaneously connected to the upper and lower end openings of any one of the filter elements 2. For each of the filter elements 2, the filtering and backwashing operations from the upper end opening are quite alike those from the lower end opening. Accordingly, only the filtering and backwashing operations from the upper end opening for the filter element 2 will be described below.

FIG. 11 shows the condition where the center filter element 2 is filtering the fluid. In the condition, none of the backwashing nozzles of the first and second backwashing pipes 3a and 3b overlaps any of the upper and lower end openings of the center filter element 2. The backwashing for the center filter element 2 has not yet started in FIG. 11. In the condition, the fluid supplied through the fluid inlet 6 shown in FIG. 1 flows in the center filter element 2 through its upper and lower end openings. The fluid having entered the filter element 2 is filtered by passing through the upper and lower portions of the filter element 2 from the inside to the outside. In this event, the upward and downward flows of the unfiltered fluid having entered through the upper and lower end openings push the first and second removal brushes 4A and 4B provided in the filter element 2 toward the partition member 23. As a result, the first removal brush 4A is pressed against the stopper 18 on the upper side of the partition member 23 and stopped moving there, and the second removal brush 4B is pressed against the stopper 18 on the lower side of the partition member 23 and stopped moving there.

FIG. 15 shows the condition where the backwashing for the upper portion of the center filter element 2 has just started. The first backwashing pipe 3a under the condition shown in FIG. 11 rotates in the direction indicated by arrow P of FIG. 13, and shifts to the condition shown in FIG. 15. In FIG. 15, the backwashing nozzle 12c of the first backwashing pipe 3a overlaps the upper end opening of the center filter element 2 with the central axis of the backwashing nozzle 12c located to the left off the central axis of the filter element 2. This condition causes the backwashing nozzle 12c to suck the fluid out of the filter element 2, thereby causing the fluid to flow into the backwashing nozzle 12c through the upper end opening of the filter element 2. As a result, the fluid starts flowing through the upper portion of the filter element 2 from the outside to the inside, which means that backwashing for the upper portion starts. At that time, the lower end opening of the filter element 2 is fully opened, and allows the unfiltered fluid to flow into the filter element 2 therethrough. The influx of the unfiltered fluid creates an upward flow, and this upward flow presses the lower removal brush 4B against the stopper 18 on the lower side of the partition member 23, so that the removal brush 4B remains stopped moving. At that time, the fluid passes through the lower portion of the center filter element 2 from the inside to the outside, which means that the lower portion is still filtering the fluid.

The unfiltered fluid having entered through the lower end opening flows upwardly through the gap g formed between the outer periphery of the partition member 23 and the inner periphery of the filter element 2. The upward flow travels above the partition member 23 and pushes the first removal brush 4A upward along the central axial rod 17. As a result, the bristles 4b on the outer periphery of this upper removal brush 4A slide in contact with the inner periphery of the upper portion of the filter element 2 to remove objects trapped and adhered to the inner periphery.

In the second embodiment, each of the partition members 23 has the structure that allows part of the fluid to flow therethrough in the corresponding filter element 2, as described above. This structure is employed in the aim of preventing, at the start of the backwashing operation for the upper portion of the filter element 2 as shown in FIG. 15, the unfiltered fluid having entered through the lower end opening from flowing directly into the backwashing nozzle 12c through the upper end opening. In other words, the narrowed channel through the gap g, which is formed between the outer periphery of the partition member 23 and the inner periphery of the filter element 2, provides a resistance that causes a difference in pressure between inside and outside the filter element 2 when the backwashing nozzle 12c sucks the fluid out of the filter element 2, and such a pressure difference causes the upper portion to be backwashed. In other words, the pressure on the backwashing fluid drain pipe 5 (see FIG. 1) side or on the backwashing nozzle 12c side is lower than the internal pressure of the filter element 2, and this pressure difference causes the fluid to flow through the gap g between the outer periphery of the partition member 23 and the inner periphery of the filter element 2 (the same applies to the condition shown in FIG. 16).

FIG. 16 shows the condition where the upper portion of the center filter element 2 is still being backwashed. The first backwashing pipe 3a under the condition shown in FIG. 15 rotates in the same direction as the above, and shifts to the condition shown in FIG. 16. In FIG. 16, the backwashing nozzle 12c of the first backwashing pipe 3a partly overlaps the upper end opening of the filter element 2 with the central axis of the backwashing nozzle 12c located to the right off the central axis of the filter element 2. At that time, the lower end opening of the filter element 2 is still fully opened, and allows the unfiltered fluid to flow into the filter element 2 therethrough. The influx of the unfiltered fluid creates an upward flow, and this upward flow presses the lower removal brush 4B against the stopper 18 on the lower side of the partition member 23, so that the removal brush 4B remains stopped moving there. At that time, the fluid passes through the lower portion of the center filter element 2 from the inside to the outside, which means that the lower portion is still filtering the fluid.

This condition causes the backwashing nozzle 12c to suck the fluid out of the filter element 2, thereby causing the fluid to flow into the first backwashing pipe 3a through the upper end opening of the filter element 2. As a result, the fluid flows through the upper portion of the filter element 2 from the outside to the inside, which means that the upper portion is still being backwashed. At that time, the unfiltered fluid having entered through the lower end opening flows upwardly through the gap g, which is formed between the outer periphery of the partition member 23 and the inner periphery of the filter element 2. The upward flow travels above the partition member 23 and pushes the first removal brush 4A upward along the central axial rod 17. Additionally, the fluid flow created by backwashing further pushes the upper removal brush 4A upward. As a result, the removal brush 4A moves upward along the central axial rod 17 till the removal brush 4A collides with the stopper 18 at the upper end of the filter element 2 while the bristles 4b on the outer periphery of the removal brush 4A slide in contact with the inner periphery of the upper portion of the filter element 2 to remove objects trapped and adhered to the inner periphery. Then, the removal brush 4A stops at its uppermost position.

The first removal brush 4A that stops after colliding with the stopper 18 narrows the flow channel in the filter element 2. Accordingly, most of the pressure (backwashing pressure) due to the backwashing fluid flow is applied on the removal brush 4A. This backwashing pressure flexes the bristles 4b that have been abutted on the inner periphery of the filter element 2, and creates a gap between the bristles 4b and the inner periphery of the filter element 2. As a result, the backwashing fluid flows into the backwashing nozzle 12c through the upper end opening of the filter element 2. Thereby, the trapped objects that the first removal brush 4A has removed from the inner periphery of the filter element 2 while moving as shown in FIG. 15 flow into the first backwashing pipe 3a through the backwashing nozzle 12c. After that, the trapped and removed objects and the backwashing fluid are introduced through the discharge pipe 11 shown in FIG. 1 into the backwashing fluid drain pipe 5, and discharged to the outside.

FIG. 17 shows the condition where the center filter element 2 is filtering the fluid. The first backwashing pipe 3*a* under the condition shown in FIG. 16 rotates in the same direction as the above, and shifts to the condition shown in FIG. 17. In the condition, the backwashing nozzle 12*c* of the first backwashing pipe 3*a* comes off the upper end opening of the filter element 2, so that the backwashing operation for the upper portion ends. At that time, the backwashing nozzle 12*c* of the first backwashing pipe 3*a* overlaps the right filter element 2, and the upper portion of the right filter element 2 is being backwashed. In the condition, the upper and lower end openings of the center filter element 2 are fully opened. Thus, the fluid supplied through the fluid inlet 6 shown in FIG. 1 flows in the center filter element 2 through its upper and lower end openings. The fluid having entered the filter element 2 is filtered by passing through the filter element 2 from the inside to the outside. In this event, the downward fluid flow having entered through the upper end opening pushes down the first removal brush 4A provided in the filter element 2 from the position shown in FIG. 16. As a result, the first removal brush 4A moves down to the stopper 18 on the upper side of the partition member 23 and stops moving there.

After that, the filtering and backwashing operations shown in FIGS. 11 and 15 to 17 are performed in each of the filter elements 2. Hereinabove, the filtering and backwashing operations only from the upper end opening of the filter element 2 have been described. However, the filtering and backwashing operations as quite alike those from the upper end opening are performed from the lower end opening. Also, the operations only in the center one of the adjacent three of the filter elements 2 shown in FIGS. 11 and 15 to 17 has been described above. However, the same filtering and backwashing operations as those in the center filter element 2 are sequentially performed in each of the left and right ones of these adjacent three of the filter elements 2 as the first and second backwashing pipes 3*a* and 3*b* rotate in the direction indicated by arrow P of FIG. 13 (identical to the direction indicated by arrow Q of FIG. 14).

In the above description, each of the trapped object removers 4 is a removal brush, as an example. However, the present invention is not limited to this. The trapped object remover 4 has only to be movable in the corresponding filter element 2 in its axial direction by the fluid flow generated during filtration or backwashing, and to have, on the outer periphery, a member capable of sliding in contact with the inner periphery of the filter element 2 and removing trapped objects from the inner periphery. For example, the trapped object remover 4 may alternatively be a blade-shaped or spatula-shaped scraper or the like made of a metal, a resin or rubber.

REFERENCE SYMBOL LIST

1 casing
2 filter element
3*a* first backwashing pipe
3*b* second backwashing pipe
4, 4A and 4B trapped object remover (removal brush)
4*a* brush main body
4*b* bristles
5 backwashing fluid drain pipe
6 fluid inlet
7 fluid outlet
8*a* and 8*b* mounting plate
9 cylindrical wall
10 through hole in mounting plate
11 discharge pipe
12*a*, 12*b* and 12*c* backwashing nozzle of first backwashing pipe
13*a*, 13*b* and 13*c* backwashing nozzle of second backwashing pipe
17 central axial rod
18 stopper
20 discharge port of backwashing fluid drain pipe
21*a*, 21*b* and 21*c* blind lid of first backwashing pipe
22*a*, 22*b* and 22*c* blind lid of second backwashing pipe
23 partition member
24 orifice

The invention claimed is:

1. A filtering apparatus, comprising:
   a casing having a fluid inlet that allows fluid to flow in from an outside of the casing, and a fluid outlet that allows the fluid filtered in the filtering apparatus to flow to the outside;
   a plurality of filter elements which are provided in parallel to each other in the casing, and each of which has a tubular shape with openings at opposite ends in a longitudinal direction thereof and filters the fluid by allowing the fluid to pass through the filter element from the inside to the outside;
   a pair of rotating backwashing pipes which are communicatively joined to a discharge side and configured to be sequentially connected to the opposite end openings of the plurality of filter elements at different timings between the opposite end openings of each of the filter elements so as to backwash the filter element that is connected to any one of the backwashing pipes by allowing the fluid to flow through the filter element from the outside to the inside;
   removal brushes each of which has a brush main body and bristles planted on an outer periphery of the brush main body and is provided in a corresponding one of the filter elements so as to be reciprocatingly movable in the filter element in opposite axial directions of the filter element between the opposite ends of the filter element by flows of the fluid in the axial directions generated during filtration or backwashing, while the bristles slide in contact with an inner periphery of the filter element so as to remove an object trapped and adhered to the inner periphery, the axial direction of the fluid flow generated during backwashing being toward either of the opposite ends of the filter element depending on which of the opposite end openings is connected to one of the backwashing pipes; and
   a backwashing fluid drain pipe for discharging, to the outside of the casing, the trapped object removed by each of the removal brushes that is reciprocatingly moved by the fluid flows generated while backwashing the corresponding filter element, the backwashing fluid drain pipe being coupled to the discharge side of the pair of backwashing pipes,
   wherein each of the pair of backwashing pipes has a connecting port and a blind lid provided to the connecting port, the connecting ports being configured to be connected to the opposite end openings of each of the filter elements, each of the blind lids being long enough to cover the end openings of any adjacent two of the filter elements and extending asymmetrically with respect to the corresponding backwashing pipe so that a longer portion of one of the blind lids extends toward the opening of one of the adjacent two filter elements and a longer portion of the other one of the blind lids extends toward the opening of the other one of the adjacent two filter elements, and wherein when either one of the pair of backwashing pipes is connected to an end opening of one of the filter elements and the corresponding removal brush has been moved to this end opening, the bristles of the removal brush are flexed by the pressure of the fluid flow toward this end opening in the filter element such that a gap is created between the bristles and the inner periphery of the filter element.

2. The filtering apparatus according to claim 1, wherein the blind lids of the pair of backwashing pipes are formed so that, when the connecting port of one of the pair of backwashing pipes is connected to one of the opposite end openings of any one of the filter elements, the other one of the opposite end openings of the filter element is closed by the longer portion, extending from the other backwashing pipe, of the blind lid of the other one of the pair of backwashing pipes.

\* \* \* \* \*